United States Patent
Derisavi et al.

(10) Patent No.: US 10,671,781 B2
(45) Date of Patent: *Jun. 2, 2020

(54) METHOD AND APPARATUS FOR PERFORMING REGISTER RETIMING IN THE PRESENCE OF FALSE PATH TIMING ANALYSIS EXCEPTIONS

(71) Applicant: Altera Corporation, San Jose, CA (US)

(72) Inventors: Salem Derisavi, Richmond Hill (CA); Gordon Raymond Chiu, Noth York (CA); Benjamin Gamsa, Toronto (CA); David Ian M. Milton, Brooklin (CA)

(73) Assignee: Altera Corporation, San Jose, CA (US)

( * ) Notice: Subject to any disclaimer, the term of this patent is extended or adjusted under 35 U.S.C. 154(b) by 146 days.

This patent is subject to a terminal disclaimer.

(21) Appl. No.: 15/951,127

(22) Filed: Apr. 11, 2018

(65) Prior Publication Data
US 2018/0232475 A1      Aug. 16, 2018

Related U.S. Application Data

(62) Division of application No. 14/627,220, filed on Feb. 20, 2015, now Pat. No. 9,971,858.

(51) Int. Cl.
| | | |
|---|---|---|
| *G06F 30/30* | (2020.01) | |
| *G06F 30/3312* | (2020.01) | |
| *G06F 30/327* | (2020.01) | |
| *G06F 30/398* | (2020.01) | |
| *G06F 119/12* | (2020.01) | |

(52) U.S. Cl.
CPC ........ *G06F 30/3312* (2020.01); *G06F 30/327* (2020.01); *G06F 30/398* (2020.01); *G06F 2119/12* (2020.01)

(58) Field of Classification Search
CPC ............... G06F 17/5031; G06F 17/505; G06F 17/5081; G06F 2217/84; G06F 30/3312; G06F 30/398; G06F 30/327; G06F 2119/12
See application file for complete search history.

(56) References Cited

U.S. PATENT DOCUMENTS

| | | |
|---|---|---|
| 5,448,497 A | 9/1995 | Ashar et al. |
| 5,553,000 A | 9/1996 | Dey et al. |
| 6,026,219 A | 2/2000 | Miller et al. |
| 6,053,949 A | 4/2000 | Takai et al. |
| 6,075,936 A | 6/2000 | Mori et al. |
| 6,336,205 B1 | 1/2002 | Kurokawa et al. |
| 6,622,290 B1 | 9/2003 | Ginetti et al. |

(Continued)

OTHER PUBLICATIONS

Application Note AC192 ("Floorplanning ProASIC® /ProASICPLUS Devices for Increased Performance"; Actel Corporation; Nov. 2003; pp. 1-21. (https://www.microsemi.com/document-portal/doc_view/ 129927-ac192-floorplanning-proasic-proasic-sup-u-plus-u-sup-devices-for-increased-performance-app-note).

(Continued)

*Primary Examiner* — Naum Levin

(57) ABSTRACT

A method for designing a system on a target device includes identifying a timing exception for a portion of a signal path. An area on the target device that includes components affected by the timing exception. Register retiming is performed where pipeline registers are added at boundaries of the area.

21 Claims, 17 Drawing Sheets

(56) References Cited

U.S. PATENT DOCUMENTS

| | | | |
|---|---|---|---|
| 6,654,939 B2* | 11/2003 | Yamamoto | G01R 31/318342 716/114 |
| 6,874,135 B2 | 3/2005 | Gupta et al. | |
| 6,941,541 B2 | 9/2005 | Snider | |
| 6,952,816 B2 | 10/2005 | Gupta et al. | |
| 6,952,817 B1* | 10/2005 | Harris | G06F 17/505 716/103 |
| 7,007,254 B1 | 2/2006 | Borkovic et al. | |
| 7,058,914 B2 | 6/2006 | Smith et al. | |
| 7,107,568 B2 | 9/2006 | Cronquist | |
| 7,120,883 B1 | 10/2006 | Antwerpen et al. | |
| 7,203,919 B2 | 4/2007 | Suaris et al. | |
| 7,289,946 B1* | 10/2007 | Lee | G01R 31/318552 703/16 |
| 7,318,213 B2 | 1/2008 | Nishi | |
| 7,350,169 B2 | 3/2008 | Baumgartner et al. | |
| 7,360,190 B1 | 4/2008 | Singh et al. | |
| 7,467,361 B2* | 12/2008 | Kakui | G06F 17/505 716/104 |
| 7,490,307 B2 | 2/2009 | Fomaciari et al. | |
| 7,500,205 B2 | 3/2009 | Paul et al. | |
| 7,571,303 B2 | 8/2009 | Smith et al. | |
| 7,584,441 B2 | 9/2009 | Gidon et al. | |
| 7,584,449 B2 | 9/2009 | Beerel et al. | |
| 7,676,768 B1 | 3/2010 | Bourgeault et al. | |
| 7,739,641 B1* | 6/2010 | Barnes | G06F 1/10 716/113 |
| 7,774,729 B1* | 8/2010 | Neto | G06F 17/505 716/108 |
| 7,853,912 B2 | 12/2010 | Binder et al. | |
| 7,945,880 B1 | 5/2011 | Albrecht et al. | |
| 8,108,812 B1* | 1/2012 | van Antwerpen | G06F 17/5054 716/104 |
| 8,136,063 B2 | 3/2012 | ispir | |
| 8,346,529 B2 | 1/2013 | Kakkar et al. | |
| 8,381,142 B1 | 2/2013 | Hutton | |
| 8,402,449 B1* | 3/2013 | Biswas | G06F 8/441 717/106 |
| 8,423,939 B1 | 4/2013 | Hurst | |
| 8,504,970 B1 | 8/2013 | Malhotra et al. | |
| 8,751,986 B2* | 6/2014 | Arunachalam | G06F 17/5072 716/110 |
| 8,863,059 B1 | 10/2014 | Fung et al. | |
| 8,893,071 B1 | 11/2014 | Gaide | |
| 8,918,748 B1 | 12/2014 | Chiu et al. | |
| 8,990,739 B2 | 3/2015 | Gu et al. | |
| 9,098,661 B1* | 8/2015 | Biswas | G06F 17/5045 |
| 9,245,085 B2* | 1/2016 | Fung | G06F 17/5054 |
| 9,251,300 B2* | 2/2016 | Hutton | G06F 17/505 |
| 9,275,184 B1 | 3/2016 | Chiu | |
| 9,292,638 B1 | 3/2016 | Chiu | |
| 9,710,591 B1* | 7/2017 | Derisavi | G06F 17/505 |
| 9,971,858 B1* | 5/2018 | Derisavi | G06F 17/5081 |
| 10,339,238 B2* | 7/2019 | Derisavi | G06F 17/5031 |
| 2002/0199161 A1* | 12/2002 | Yamamoto | G01R 31/318342 716/114 |
| 2003/0105617 A1 | 6/2003 | Cadambi et al. | |
| 2004/0225970 A1 | 11/2004 | Oktem | |
| 2005/0225365 A1 | 10/2005 | Wood | |
| 2013/0174113 A1* | 7/2013 | Lecler | G06F 17/5072 716/122 |
| 2013/0297278 A1 | 11/2013 | Narayanaswamy et al. | |
| 2014/0310696 A1 | 10/2014 | Vorbach | |
| 2016/0371403 A1* | 12/2016 | Sinnadurai | G06F 17/5081 |
| 2017/0286590 A1* | 10/2017 | Derisavi | G06F 17/505 |
| 2018/0232475 A1* | 8/2018 | Derisavi | G06F 17/5081 |

OTHER PUBLICATIONS

Final Office Action for U.S. Appl. No. 14/627,220, dated Oct. 3, 2017, 24 pages.
Hans-Georg Martin; "Retiming for Circuits with Enable Registers"; IEEE; 1996; pp. 275-280.
Office Action for U.S. Appl. No. 14/627,220, dated Jun. 15, 2017, 20 pages.
Restriction Requirement for U.S. Appl. No. 14/627,220, dated Jan. 3, 2017, 5 pages.
Zheng et al.; "High-Level Synthesis with Behavioral-Level Multicycle Path Analysis"; IEEE transactions on computer-aided design of integrated circuits and systems; vol. 33; No. 12; Dec. 2014; pp. 1832-1845.

\* cited by examiner

| | Recommendations at Retiming Limit | Critical Chain | | |
|---|---|---|---|---|
| | Path Info | Register | Join | Element |
| 1 | Domain Boundary Entry | | #1 | |
| 2 | | empty slot | | a_r\|d |
| 3 | Long Path | REG (required) | | a_r |
| 4 | Long Path | | | a_r\|q |
| 5 | Long Path | | | a_r~la_mlab/laboutb[12] |
| 6 | Long Path | | | a_r~LAB_RE_X135_Y135_N0_I122 |
| 7 | Long Path | empty slot | | a_r~R3_X136_Y135_N0_I2 |
| 8 | Long Path | | | a_r~R32_C27_INTERCONNECT_DRIVER_X137_Y135_N0_I4 |
| 9 | Long Path | empty slot | | a_r~C27_X137_Y109_N0_I0 |
| 10 | Long Path | empty slot | | a_r~C27_X137_Y82_N0_I0 |
| 11 | Long Path | empty slot | | a_r~C27_X137_Y55_N0_I0 |
| 12 | Long Path | empty slot | | a_r~C27_X137_Y28_N0_I0 |
| 14 | Long Path | | | a_r~C27_X137_Y1_N0_I21 |
| 15 | Long Path | empty slot | | a_r~R3_X135_Y17_N0_I20 |
| 16 | Long Path | | | a_r~R32_C27_INTERCONNECT_DRIVER_X134_Y17_N0_I6 |
| 17 | Long Path | empty slot | | a_r~R32_X121_Y17_N0_I21 |
| 18 | Long Path | empty slot | | a_r~R32_X115_Y17_N0_I13 |
| 19 | Long Path | empty slot | | a_r~R32_X96_Y17_N0_I0 |
| 20 | Long Path | empty slot | | a_r~R32_X78_Y17_N0_I30 |
| 21 | Long Path | empty slot | | a_r~R32_X78_Y17_N0_I50 |
| 22 | Long Path | empty slot | | a_r~R32_X65_Y17_N0_I0 |
| 24 | Long Path | | | a_r~R32_X34_Y17_N0_I0 |
| 25 | Long Path | empty slot | | a_r~R32_X2_Y17_N0_I0 |
| 26 | Long Path | empty slot | | a_r~R6_X9_Y17_N0_I12 |
| 27 | Long Path | empty slot | | a_r~C4_X14_Y13_N0_I30 |
| 28 | Long Path | empty slot | | a_r~LOCAL_INTERCONNECT_X14_Y14_N0_I0 |
| 29 | Long Path | | | a_r~LAB_RE_X14_Y14_N0_I32 |
| 30 | Long Path | empty slot | | b_r\|d |
| 33 | Long Path | | | c_r\|q |
| 34 | Long Path | | | c_r~la_lab/laboutt[17] |
| 35 | Long Path | | | c_r~LAB_RE_X23_Y18_N0_I107 |
| 36 | Long Path | empty slot | | c_r~R6_X23_Y18_N0_I7 |
| 37 | Long Path | empty slot | | c_r~LOCAL_INTERCONNECT_X24_Y18_N0_I9 |
| 38 | Long Path | | | c_r~LAB_RE_X24_Y18_N0_I73 |
| 39 | Long Path | empty slot | | d_r\|d |
| 41 | Long Path | | | d_r\|q |
| 42 | Long Path | | | d_r~la_mlab/laboutb[16] |
| 43 | Long Path | | | d_r~LAB_RE_X24_Y18_N0_I126 |
| 44 | Long Path | empty slot | | d_r~LOCAL_INTERCONNECT_X24_Y18_N0_I22 |
| 45 | Long Path | | | d_r~LAB_RE_X24_Y18_N0_I75 |
| 46 | Long Path | empty slot | | e_r\|d |
| 48 | Long Path | | | e_r\|q |
| 49 | Long Path | | | e_r~la_mlab/laboutb[19] |
| 50 | Long Path | | | e_r~LAB_RE_X24_Y18_N0_I129 |
| 51 | Long Path | empty slot | | e_r~LOCAL_INTERCONNECT_X24_Y18_N0_I37 |
| 52 | Long Path | | | e_r~LAB_RE_X24_Y18_N0_I19 |
| 53 | Long Path | empty slot | | f_r~reg0\|d |
| 54 | Long Path | REG (required) | | f_r~reg0 |
| 55 | | | | f_r~reg0\|q |
| 56 | | | | f_r~reg0la_mlab/laboutt[9] |
| 57 | | | | f_r~reg0_LAB_RE_X24_Y18_N0_I99 |
| 58 | | empty slot | | f_r~reg0_C4_X23_Y19_N0_I18 |
| 59 | Domain Boundary Entry | | #2 | |

FIG. 11

METHOD AND APPARATUS FOR PERFORMING REGISTER RETIMING IN THE PRESENCE OF FALSE PATH TIMING ANALYSIS EXCEPTIONS

RELATED APPLICATION

This application is a divisional of and claims priority and benefit to U.S. application Ser. No. 14/627,220 filed on Feb. 20, 2015, entitled, "Method and Apparatus for Performing Register Retiming in the Presence of False Path Timing Analysis Exceptions", now U.S. Pat. No. 9,971,858.

FIELD

Embodiments of the present invention relate to tools for designing systems on target devices. More specifically, embodiments of the present invention relate to a method and apparatus for performing register retiming in the presence of false path timing analysis exceptions.

BACKGROUND

Target devices such as field programmable gate arrays (FPGAs), application specific integrated circuits (ASICs), and structured ASICs are used to implement large systems that may include millions of gates and megabits of embedded memory. The complexity of a large system often requires the use of electronic design automation (EDA) tools to create and optimize a design for the system onto physical target devices. Among the procedures performed by EDA tools in a computer aided design (CAD) compilation flow are design generation and integration, synthesis, placement, and routing of the system on the target device.

When addressing conventional timing closure, designers focus on the critical paths in a design. A critical path is a path from a register to another register, through combinational or routing elements, which fails or is close to failing a timing requirement. In an effort to close timing, a designer may examine the critical path and attempt to improve it by reducing an amount of combinational or routing delay along the path.

EDA tools may utilize register retiming algorithms in order to close timing. Register retiming is a synchronous circuit transformation that is used to improve the speed-performance of a synchronous circuit. Register retiming involves moving register across combinational or routing circuit elements in order to reduce the length of timing-critical paths. Register retiming may also involve inserting pipelined registers along timing-critical paths in order to split combinational logic into multiple cycles which leads to an increase of slack in timing-critical paths. This allows for an increase in clock rate, and/or an increase in throughput. The combinational structure remains unchanged and the observable behavior of the circuit is identical to the original circuit.

SUMMARY

Designers may use timing analysis exceptions such as false paths, multicycle, and minimum and maximum delay constraints for portions of a signal path. These timing analysis exceptions, however, can limit optimizations associated with register retiming. Traditional register retiming techniques cannot move registers across a timing analysis exception. As a result, the timing analysis exception may limit the performance of the system. In addition, traditional register retiming techniques fail to utilize the arbitrary delay between two registers when a false path timing analysis exception is present.

Embodiments of the present invention enable a system designer unit to move registers across a timing analysis exception to improve circuit performance. From the specification of the timing analysis exception, components (nodes) affected by the timing analysis exceptions are represented as constraints. The constraints are enforced to preserve the legality of the timing analysis exceptions in the presence of register retiming. This allows register retiming to be performed in the presence of timing analysis exceptions, while still preserving the exception. In addition, other embodiments of the present invention may utilize the properties of false paths and add pipeline registers at the boundaries of a false path timing analysis exception to improve circuit performance.

According to an embodiment of the present invention, a method for designing a system on a target device includes identifying a timing exception for a portion of a signal path. An area on the target device that includes components impacted by the timing exception is identified. Register retiming is performed where a register is moved from a first position on the signal path on one side of the area to a second position on the signal path on another side of the area. According to an aspect of the present invention, the timing exception for the portion of the signal path includes a timing condition permitted that is different from a default timing constraint applied to other portions of the signal paths or to other signal paths. According to another aspect of the present invention, the timing exception may be a multicycle that identifies how a default timing constraint may be applied differently to the portion of the signal path, a false path that excludes a default timing constraint from being applied to the portion of the signal path, or a minimum delay and maximum delay for a signal on the portion of the signal path. The timing exception may be provided by a user after timing analysis is performed on the system or provided during design entry prior to synthesis, placement, and routing of the system.

According to an embodiment of the present invention, a method for designing a system on a target device includes identifying a timing exception for a portion of a signal path. An area on the target device that includes components impacted by the timing exception is identified. The timing exception may be, for example, a false path. Register retiming is performed where pipeline registers are added at boundaries of the area. The boundaries of the area may be the location of the source and destination keepers of a false path. According to an aspect of the present invention, the pipeline registers are added in response to an assignment set by a user. The assignment set by the user may specify which signal paths affected by a false path should have pipeline registers added. According to another aspect of the present invention, a report is generated to a user that identifies a number and location of the pipeline registers added.

BRIEF DESCRIPTION OF THE DRAWINGS

The features and advantages of embodiments of the present invention are illustrated by way of example and are not intended to limit the scope of the embodiments of the present invention to the particular embodiments shown.

FIG. 11 illustrates a report generated that identifies the results of register retiming according to an embodiment of the present invention.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
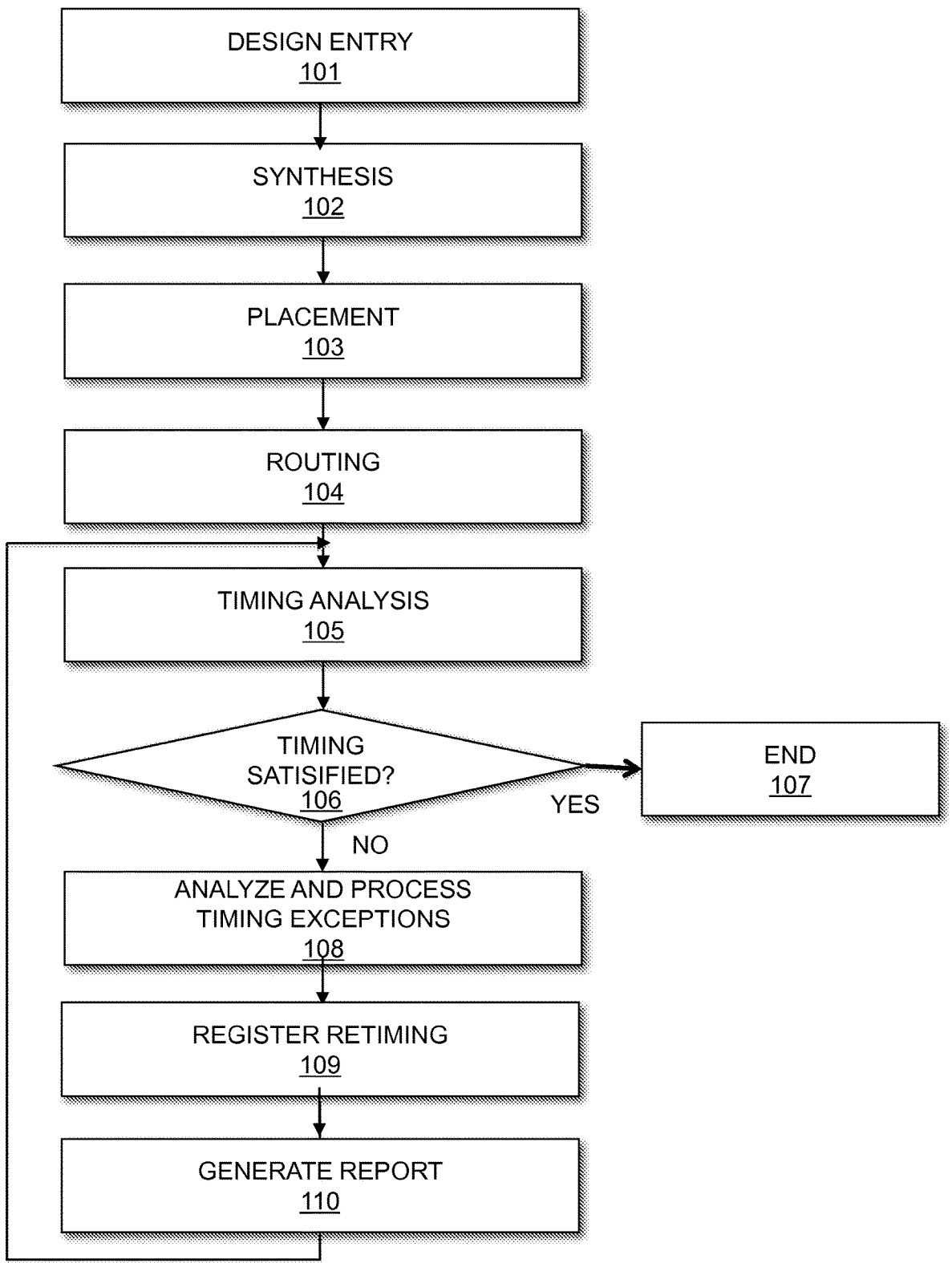
FIG. 1 is a flow chart illustrating a method for designing a system on a target device according to a first exemplary embodiment of the present invention.

FIG. 1 is a flow chart illustrating a method for designing a system on a target device according to a first exemplary embodiment of the present invention. The target device may be a field programmable gate array (FPGA), application specific integrated circuit (ASIC), a structured ASIC, or other programmable device. According to one embodiment, the procedure illustrated in FIG. 1 may be performed by a computer aided design (CAD)/electronic design automation (EDA) tool implemented on a computer system.

At 101, a design for a system is entered. The specification for the system may be provided though a design entry tool. The specification may describe components and interconnections in the system. According to an embodiment of the present invention, timing exceptions are included with the specification for the system. The timing exceptions may be applied to a portion of a signal path where the timing exception for the portion of the signal path is different from a default timing constraint applied to other portions of the signal path.

At 102, the system is synthesized. Synthesis includes generating a logic design of the system to be implemented by the target device. According to an embodiment of the present invention, synthesis generates an optimized logical representation of the system from an HDL design definition. The optimized logical representation of the system may include a representation that has a minimized number of functional blocks such as logic gates, logic elements, and registers required for the system. Synthesis also includes mapping the optimized logical representation. Mapping includes determining how to implement logic gates and logic elements in the optimized logic representation with the types or categories of resources available on the target device. The resources available on the target device may be referred to as "cells" or "components" and may include logic-array blocks, registers, memories, digital signal processing blocks, input/output elements, and other components. According to an embodiment of the present invention, a netlist is generated from mapping. This netlist may be an optimized technology-mapped netlist generated from the HDL.

At 103, the system is placed. According to an embodiment of the present invention, placement involves placing the technology-mapped logical system design on the target device. Placement includes fitting the system on the target device by determining which specific resources on the target device are to be assigned to and implemented by the technology-mapped netlist determined during synthesis. Placement may include clustering which involves grouping logic elements together to form the logic clusters present on the target device.

At 104, the placed design is routed. During routing, routing resources on the target device are allocated to provide interconnections between logic gates, logic elements, and other components on the target device. Routability optimization may also be performed on the placed logic design. According to an embodiment of the present invention, the goal of routability optimization is to reduce the amount of wiring used to connect components in the placed logic design. Routability optimization may include performing fanout splitting, logic duplication, logical rewiring, or other procedures. It should be appreciated that one or more of the procedures may be performed on the placed logic design.

At 105, timing analysis is performed on the design of the system generated. According to an embodiment of the present invention, the timing analysis determines whether timing constraints of the system are satisfied. The timing analysis may utilize approximations depending on when it is performed. According to an embodiment of the present invention, timing analysis establishes a delay for each path in the system as well as the slack for each path in the system. Slack may be defined to be the amount of delay that can be added to a path before it becomes critical or required time for signal arrival minus actual time of signal arrival.

At 106, if it is determined that the design for the system meets timing constraints, control proceeds to 107. If it is determined that the design for the system does not meet timing constraints, control proceeds to 108.

At 107, control terminates the procedure.

At 108 timing exceptions are analyzed and processed. According to an embodiment of the present invention, areas on the target device that include components affected by timing exceptions for portions of signal paths are identified. The areas may also be referred to as "clouds". Unallocated registers on the target device residing in the clouds are identified as registers that may not be utilized for register retiming. Constraints may be utilized to prevent register retiming from utilizing the registers in the clouds.

At 109, register retiming is performed on the system. According to an embodiment of the present invention, register retiming may involve moving registers across combinational or routing circuit elements to reduce the length of timing-critical or near critical paths as determined by the timing analysis procedure 106. In addition, register retiming may also involve adding pipelined registers on a path affected by a false path timing exception at the boundaries of the area(s) identified at 108. Register retiming is performed respecting the constraints established at 108. It should be appreciated that register retiming may also be performed respecting other computed constraints. Register retiming may operate in response to settings set by the user which specify when to move registers, which registers to move, and when and where to add pipelined registers.

At 110, a report is generated that identifies the results of register retiming to a user. According to an embodiment of the present invention, the report may identify registers that have moved over an exception and a critical chain that has been retimed. The report may also identify a number and location of the pipeline registers added. Information from the report may be used by the user to modify settings for register retiming during a next iteration.

Control returns to timing analysis at 105 to determine whether timing is satisfied. Register retiming may be further performed if timing is not satisfied by repeating procedures 108-110. After a predetermined number of iterations, control may proceed to 107. It should be appreciated that in addition to entering timing exceptions during design entry 101 that timing exceptions may also be entered after timing analysis 105.

Timing analysis 105 and register retiming 109 are illustrated in FIG. 1 as being procedures that are performed after routing 104. It should be appreciated that in alternate embodiments of the present invention timing analysis 105 and register retiming 109 may also be performed during or immediately after synthesis 102, placement 103, and/or routing 104. In the alternate embodiments where timing analysis is performed prior to the completion of routing 104, control would continue the design flow instead of terminating it when timing constraints are satisfied. Another timing analysis may be performed at the completion of routing 104 to determine whether to terminate the design flow.

Figure 2:
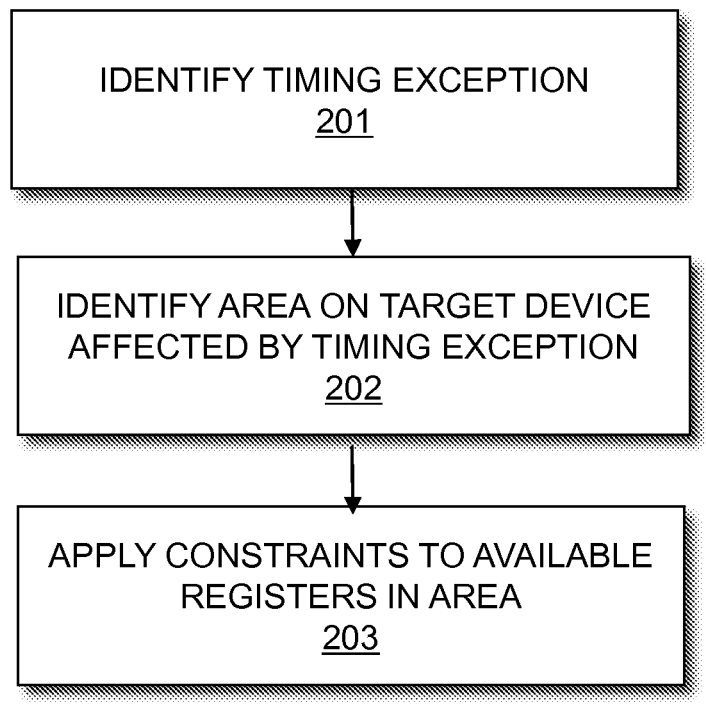
FIG. 2 is a flow chart illustrating a method for analyzing and processing timing exceptions according to an exemplary embodiment of the present invention.

FIG. 2 is a flow chart illustrating a method for analyzing and processing timing exceptions according to an exemplary embodiment of the present invention. The method illustrated in FIG. 2 may be used to implement procedure 108 shown in FIG. 1. At 201, timing exceptions are identified for portions of signal paths in the system. A signal path may traverse a plurality of components (nodes). A portion of the signal path may include a subset of the components and routing path in the signal path. Timing exceptions may be entered during design entry, after timing analysis, or during other portions of the design flow illustrated in FIG. 1. The timing exceptions may include false path, multi-cycle, minimum/maximum delay and other exceptions.

At 202, areas on the target device affected by the timing exceptions are identified. According to an embodiment of the present invention, a first component at a beginning of a timing exception is identified. A second component at an end of the timing exception is identified. An area affected by a timing exception may be defined to include the first component, the second component, and all components along a portion of a path between the first and second components.

At 203, constraints are applied to both allocated and unallocated registers in the area for the purpose of register retiming a signal along the path. The constraints enforce the preservation and legality of the exception when register retiming is performed. When register retiming is attempted for a particular signal path, the unallocated registers in the identified area would be made unavailable. This results in a selection of unallocated registers outside the identified area for register retiming. This has the effect of moving a register across the area during register retiming.

Figure 3A:
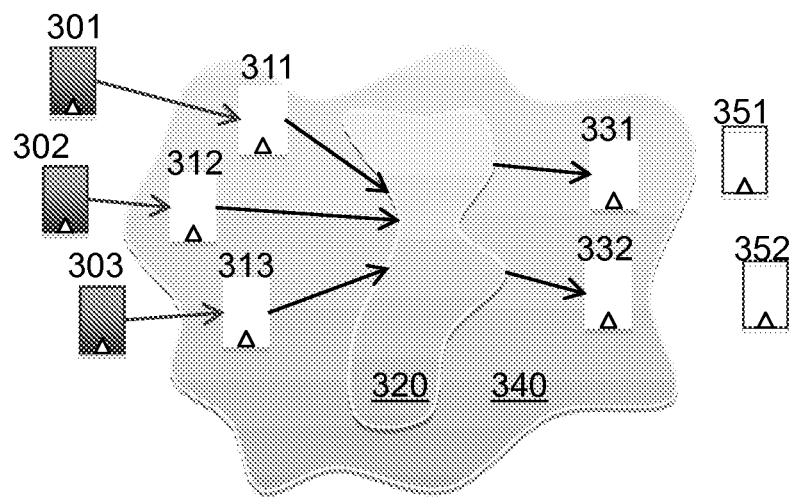
FIGS. 3A and 3B illustrate an example of performing register retiming in the presence of a timing exception according to a first embodiment of the present invention.
Figure 3B:
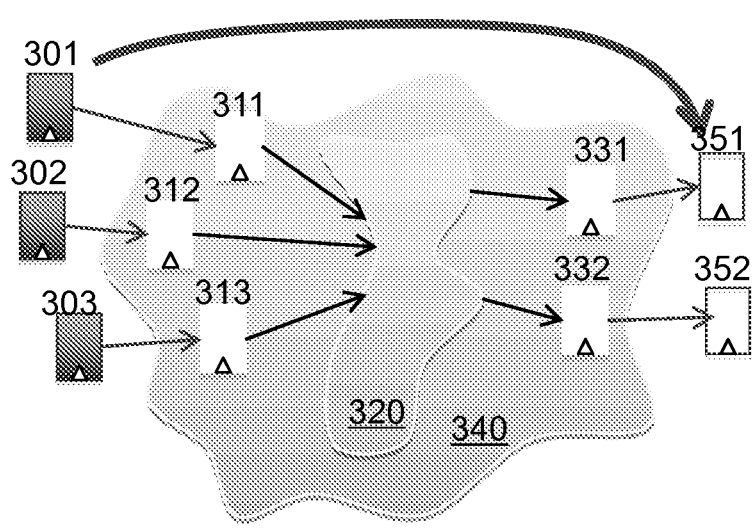

FIGS. 3A and 3B illustrate examples of register retiming in the presence of a timing exception according to a first embodiment of the present invention. FIG. 3A illustrates a network of components in a system on a target device. As shown, a first plurality of registers 301-303 transmit signals through the network along signal paths. When a timing exception exists for a portion of a signal path, one or more of the components in the network may be affected. In this example, a timing exception affects registers 311-313 (exception source keepers), combinational logic 320, and registers 331-332 (exception destination keepers). According to an embodiment of the present invention, a keeper may be a register or an input/output pin on the target device. An exception source keeper and an exception destination keeper are registers at the beginning and end of a portion of a data path affected by a timing exception.

Together, registers 311-313, combinational logic 320, and registers 331-332, define an area or cloud 340 on the target device where register retiming may not be performed. This prevents registers 311-313 and 331-332 from being retimed and effectually moved outside the area. It should be appreciated that the target device may include one or more unused or unallocated registers (not shown) in area 340. Any unused or unallocated registers within the area 340 on the target device may not be used for register retiming. Allowing registers in area 340 that have different timing requirements to move may lead a register retiming procedure to converge on a lower maximum frequency requirement for the system.

Referring to FIG. 3B, registers 301-303 are allowed to be retimed by moving the registers 301-303 forward over the area 340 to unallocated registers 351-352. This allows the area 340 with components affected by the timing exception and timing constraints between registers 311-313 and 331-332 to be preserved.

Figure 4A:
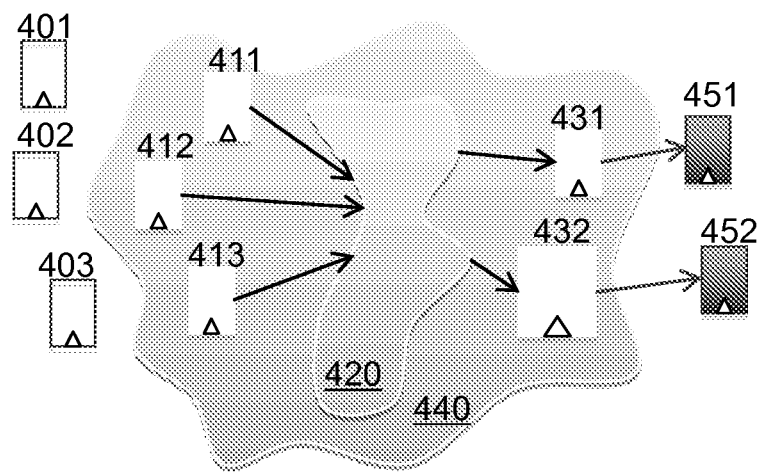
FIGS. 4A and 4B illustrate an example of performing register retiming in the presence of a timing exception according to a second embodiment of the present invention.
Figure 4B:
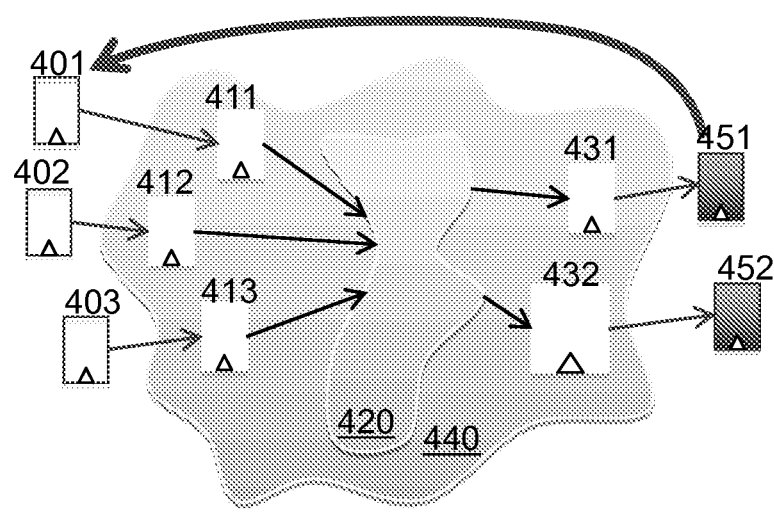

FIGS. 4A and 4B illustrate examples of register retiming in the presence of a timing exception according to a second embodiment of the present invention. Similar to FIG. 3A, FIG. 4A illustrates a network of components in a system on a target device. As shown, a first plurality of registers 411-413 transmit signals through the network along signal paths to registers 451-452. When a timing exception exists for a portion of a signal path, one or more of the components in the network may be affected. In this example, a timing exception affects registers 411-413 (exception source keepers), combinational logic 420, and registers 431-432 (exception destination keepers). Together these registers and logic define an area or cloud 440 on the target device where register retiming may not be performed. As such, registers 411-413 and 431-432 may not be moved. It should be appreciated that the target device may include one or more unused or unallocated registers (not shown) in area 440. Furthermore, any unused or unallocated registers within the area 440 on the target device may not be used for register retiming. Allowing registers in area 440 that have different timing requirements to move may lead a register retiming procedure to converge on a lower maximum frequency requirement for the system.

Referring to FIG. 4B, registers 451-452 are allowed to be retimed by moving the registers 451-452 backwards over the area 440 to unallocated registers 401-402. This allows the area 440 with components affected by the timing exception and timing constraints between registers 411-413 and 431-432 to be preserved.

Figure 5:
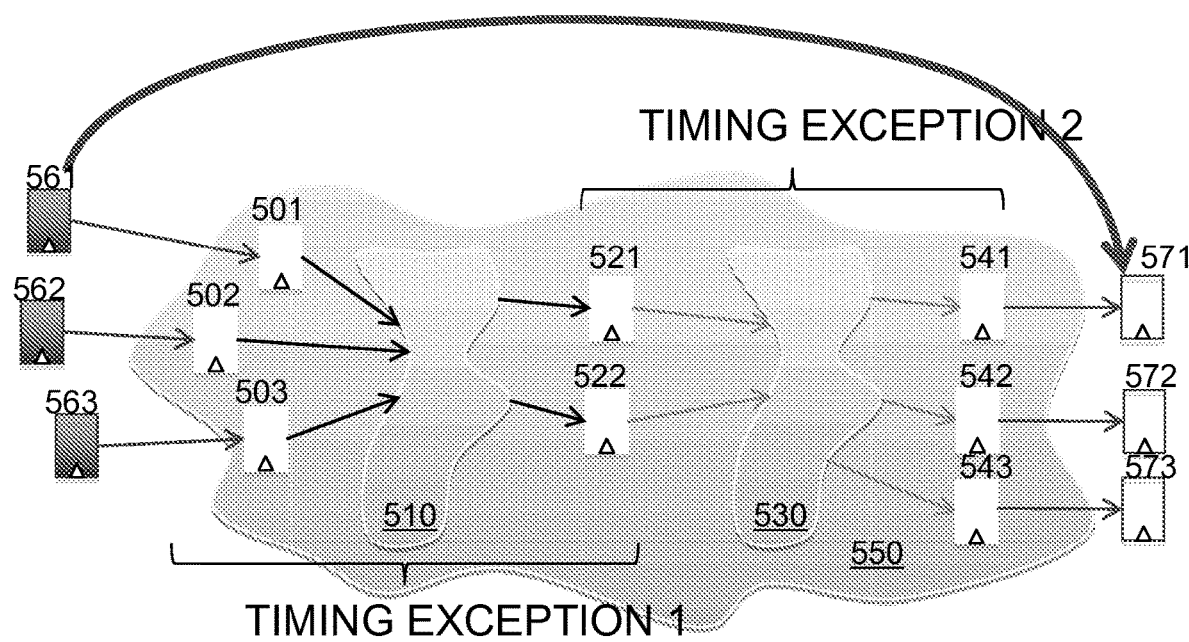
FIG. 5 illustrates an example of performing register retiming in the presence of a plurality of timing exception according to a third embodiment of the present invention.

FIG. 5 illustrates an example of register retiming in the presence of a plurality of timing exceptions according to an embodiment of the present invention. In this example, a first timing exception affects a first plurality of registers 501-503 (exception source keepers), combinational logic 510, and a second plurality of registers 521-522 (exception destination keepers) to define a first area. A second timing exception affects the second plurality of registers 521-522 (exception source keepers), combinational logic 530, and a third plurality of registers 541-543 (exception destination keepers) to define a second area. Since the timing exceptions generate overlapping areas, register retiming should not be performed across either areas. Both areas are merged together to form merged area 550. Registers 561-563 are allowed to be retimed by moving the registers forward over merged area 550 to unallocated registers 571-573.

Figure 6:
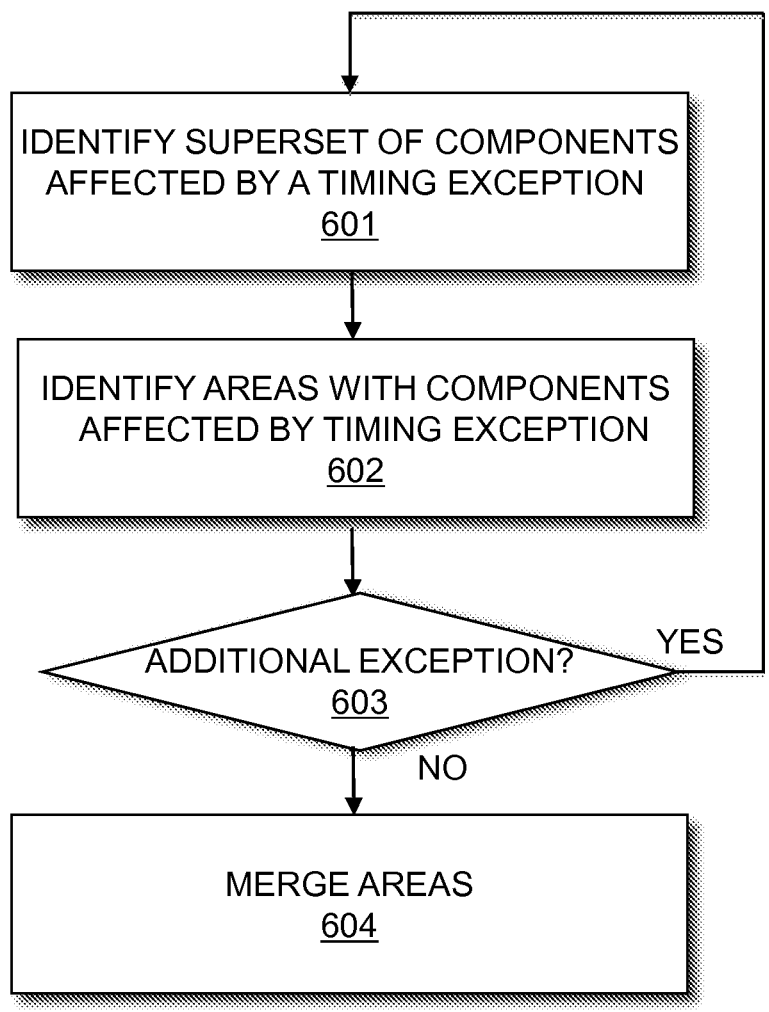
FIG. 6 is a flow chart illustrating a method for identifying an area that includes components affected by timing exceptions according to an exemplary embodiment of the present invention.

FIG. 6 is a flow chart illustrating a method for identifying one or more areas that includes components affected by timing exceptions according to an exemplary embodiment of the present invention. The method illustrated in FIG. 6 may be used to implement in part procedure 202 illustrated in FIG. 2. According to an embodiment of the present invention, the method illustrated in FIG. 6 identifies one or more clouds of nodes which represent components affected by timing exceptions. Each timing exception has a list of exception source keepers and exception destination keepers associated with it. At 601, a superset of source components affected by a timing exception is identified. According to an embodiment of the present invention, the superset of source components are the source keepers of potential clouds.

At 602, from the superset of source components, one or more areas that include components affected by the timing exception are identified.

At 603, it is determined whether additional exceptions exist. If an additional exception which has yet to be analyzed exists, control returns to 601 and performs the procedure with the new exception. If an additional exception which has yet to be analyzed does not exist, control proceeds to 604.

At 604, all the areas identified at 602 for all exceptions are merged. According to an embodiment of the present invention, merging involves combining two areas when the areas share a common component.

Figure 7:
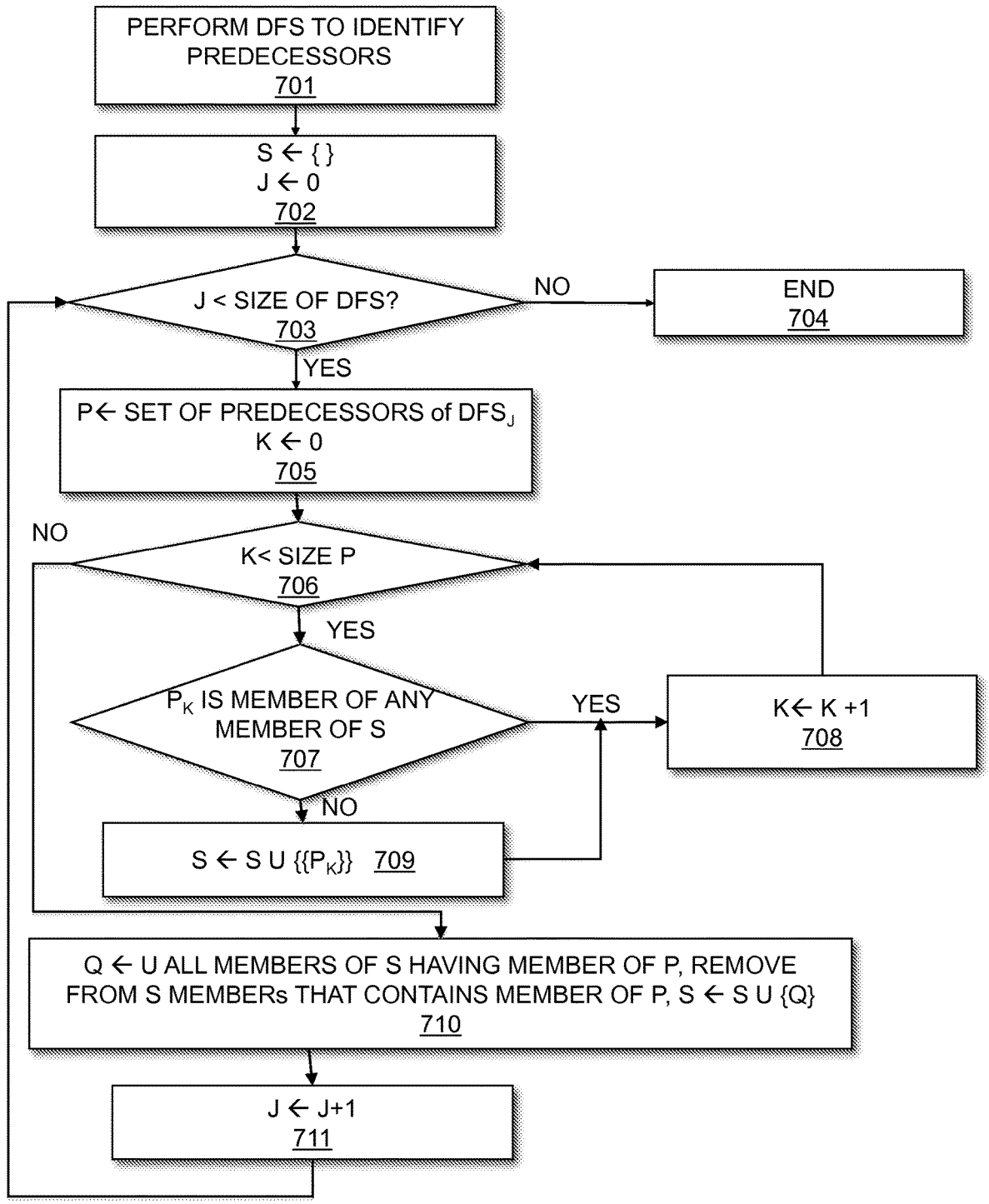
FIG. 7 is a flow chart illustrating a method for identifying a superset of source components affected by a timing exception according to an exemplary embodiment of the present invention.

FIG. 7 is a flow chart illustrating a method for identifying a superset of source components affected by a timing exception according to an exemplary embodiment of the present invention. The superset of source components represent source keepers of potential clouds. According to an embodiment of the present invention, the method illustrated in FIG. 7 may be used to implement procedure 601 illustrated in FIG. 6. The method illustrated in FIG. 7 is performed for each timing exception of a system design. At 701, a depth first search is performed in a backward direction starting from each of the exception destination keepers, $DST_i$, associated with an exception. The depth first search is stopped on any path when a keeper is encountered. A keeper may be a register or an input/output pin. The set DFS is designated to be a set of nodes visited during the depth first search excluding the keepers. $DFS_j$ is the jth element of the depth first search.

At 702, the superset of source components is designated to be set S, and is initialized to be an empty set. The index j is initialized to be zero.

At 703, control determines whether index j is less than the number of visited components from 701. If index j is not less than the number of visited components, control terminates the method at 704. If index j is less than the number of visited components, control proceeds to 705.

At 705, the predecessors of the jth component visited from the depth first search is added to a set of predecessors, P. The index k is set to zero.

At 706, it is determined whether the index k is less than the size of P. If the index k is not less than the size of the set of predecessors, P, control proceeds to 710. If the index k is less than the size of the set of predecessors, P, control proceeds to 707.

At 707, it is determined whether $P_k$ is a member of any member of S. If $P_k$ is a member of any member of S, control proceeds to 708. If $P_k$ is not a member of any member of S, control proceeds to 709.

At 708, the index k is incremented by one. Control returns to 706.

At 709, the superset of source components, S, is updated by taking the union of S with $P_k$. Control returns to 708.

At 710, a set Q is created which takes a union of elements in subsets in set S which have an element in set P. The set S is then updated by removing any subset which includes a member of set P. The set S is then further updated by taking the union of S with the set Q.

At 711, the index j is incremented by one. Control returns to 703.

Figure 8:
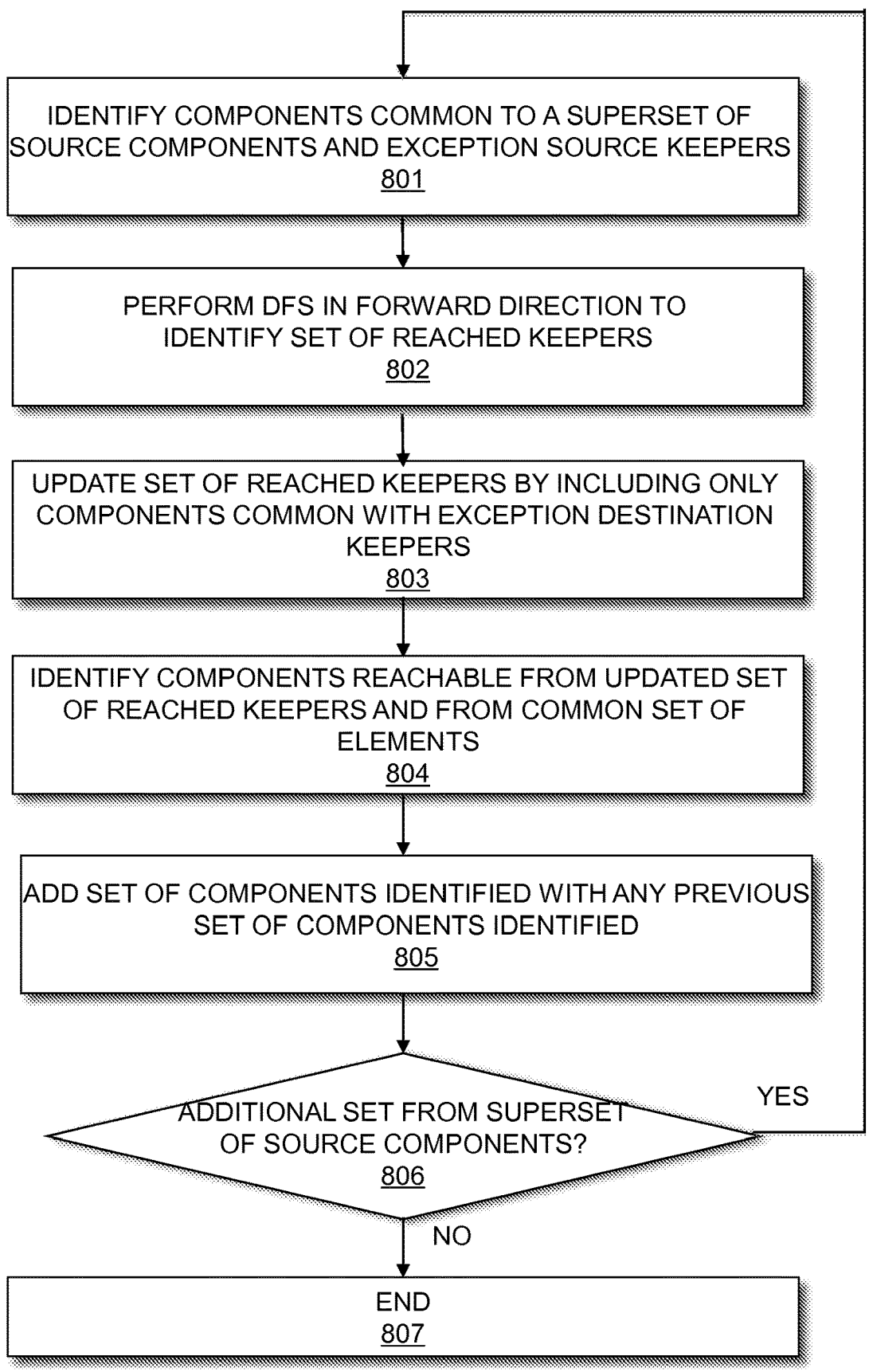
FIG. 8 is a flow chart illustrating a method for identifying areas that include one or more sets of components affected by a timing exception according to an exemplary embodiment of the present invention.

FIG. 8 is a flow chart illustrating a method for identifying a set of components affected by a timing exception according to an exemplary embodiment of the present invention. The procedures from FIG. 8 identify one or more clouds of nodes which represent components affected by a timing exception. According to an embodiment of the present invention, the procedures illustrated in FIG. 8 may be used to implement procedure 602 illustrated in FIG. 6. At 801, components common to a set from the superset of source components and exception source keepers are identified. This common set of elements may be designated S'.

At 802, a depth first search (DFS) in a forward direction starting from each component identified at procedure 801 is performed. The DFS is stopped on any path when a keeper is encountered. The set of reached keepers may be designated as D'.

At 803, the set of reached keepers, D', is updated by including only components common with exception destination keepers.

At 804, all components reachable in a backward direction from the updated set of reached keepers, D', and in a forward direction from the common set of elements, S', are identified as being in a set of components affected by the timing exception.

At 805 the set of components identified at 804 are added to any previous set of components identified.

At 806, it is determined whether another set of superset of source components exists. If it is determined that another set of superset of source components exists, control returns to 801 and performs the procedure on the new set from the superset of source components. If it is determined that another set from the superset of source components do not exist, control terminates the procedure at 807.

According to an embodiment of the present invention, the procedures illustrated in FIGS. 6-8 may be implemented using the pseudo code listed below.

---

For exception specification i
    In the netlist, perform depth first search back from the set
    of destination keepers stopping on each search path when a keeper
    is encountered. While searching, for each visited node v do:
        i. P = {set of predecessors of v}
        ii. For each p in P
            If p is not a member of any member in S
            S = S ∪ {{p}}
        iii. Q = ∪ of all members of S that contain any member
        of P
        iv. Remove from S any member that contains any member
        of P
        v. S = S ∪ {Q}
    For each s in S
        vi. S' = ∩ of S and source keepers of exception
        specification
        vii. In the netlist, perform depth first search forward from S'
        stopping on each search path when a keeper is encountered.
        Call D' the set of reached keepers.
        viii. D'=D' ∩ with destination keepers of exception
        specification
        ix. Cloud = set of all nodes reachable backwards from D'
        and forward from S'
        x. Add cloud to C_i
Merge clouds in all C_is

---

Figure 9:
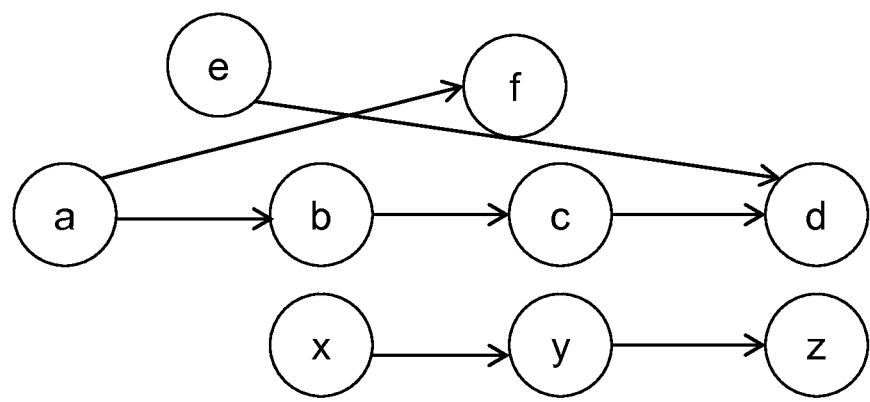
FIG. 9 illustrates a network of components according to an exemplary embodiment of the present invention.

FIG. 9 illustrates a network of components to illustrate an example for identifying one or more areas affected by timing exceptions according to an exemplary embodiment of the present invention. In this example, there are two exception specifications. The first exception specification includes source keepers {e, b, x}, and destination keepers {f, c, y}. The second exception specification includes source keeper {c}, and destination keeper {d}. All of the components (nodes) in the network are keepers.

Referring back to FIG. 7, a superset of source components that represent source keepers of potential clouds is identified. For the first exception, at 701, a depth first search is performed in a backward direction starting from each of the exception destination keepers {f, c, y}. For $DFS_1$=f, the depth first search visits and stops at the component a.

At 705, the first component visited from the depth first search is added to a set of predecessors, P. P={a}.

At 709, the superset of source components, S, is updated by taking the union of S with $P_k$. S={{a}}.

At 710, a set Q is created which takes a union of elements in subsets in set S which have an element in set P. The set S is then updated by removing any subset which includes a member of set P. The set S is then further updated by taking the union of S with the set Q. S={{a}}.

At 711, j is incremented by one and returns to 703.

At 705, the second component visited from the depth first search is added to a set of predecessors, P. P={b}.

At 709, the superset of source components, S, is updated by taking the union of S with $P_k$. S={{a}, {b}}.

At 710, a set Q is created which takes a union of elements in subsets in set S which have an element in set P. The set S is then updated by removing any subset which includes a member of set P. The set S is then further updated by taking the union of S with the set Q. S={{a}, {b}}.

At 711, j is incremented by one and returns to 703.

At 705, the third component visited from the depth first search is added to a set of predecessors, P. P={x}.

At 709, the superset of source components, S, is updated by taking the union of S with $P_k$. S={{a}, {b}, {x}}.

At 710, a set Q is created which takes a union of elements in subsets in set S which have an element in set P. The set S is then updated by removing any subset which includes a member of set P. The set S is then further updated by taking the union of S with the set Q. S={{a}, {b}, {x}}.

At 711, j is incremented by one and returns to 703.

At 703, since j is not less than the number of visited components, control terminates the method at 704.

Referring back to FIG. 8, a set of components affected by the first timing exception is identified. At 801, components common to a first set from the superset of source components, S, and exception source keepers are identified. The first set from the superset of source components is {a}. The exception source keepers are {e, b, x}. The common set of elements designated S' is an empty set.

At 802, a depth first search in a forward direction starting from each component identified at procedure 801 is performed. The DFS is stopped on any path when a keeper is encountered. The set of reached keepers designated as D' is an empty set.

At 803, the set of reached keepers, D', is updated by including only components common with exception destination keepers. The updated set is an empty set.

At 804, all components reachable in a backward direction from the updated set of reached keepers, D', and in a forward direction from the common set of elements, S', are identified as being in a set of components affected by the timing exception. For this iteration, the set is an empty set.

At 806, control determines a second set from the superset of source components exists. Control returns to 801.

At 801, components common to the second set from the superset of source components and exception source keepers are identified. The second set from the superset of source components is {b}. The exception source keepers are {e, b, x}. The common set of elements designated S' is {b}.

At 802, a depth first search in a forward direction starting from each component identified at procedure 801 is performed. The DFS is stopped on any path when a keeper is encountered. The set of reached keepers designated as D' is {c}.

At 803, the set of reached keepers, D', is updated by including only components common with exception destination keepers. The updated set is {c}.

At 804, all components reachable in a backward direction from the updated set of reached keepers, D', and in a forward direction from the common set of elements, S', are identified as being in a set of components affected by the timing exception. For this iteration, the set is {b, c}.

At 805, the set of components identified at 804 is the first non-empty set of components identified and is added to sets of components identified.

At 806, control determines a third set from the superset of source components exists. Control returns to 801.

At 801, components common to the third set from the superset of source components and exception source keepers are identified. The third set from the superset of source components is {x}. The exception source keepers are {e, b, x}. The common set of elements designated S' is {x}.

At 802, a depth first search in a forward direction starting from each component identified at procedure 801 is performed. The DFS is stopped on any path when a keeper is encountered. The set of reached keepers designated as D' is {y}.

At 803, the set of reached keepers, D', is updated by including only components common with exception destination keepers. The updated set is {y}.

At 804, all components reachable in a backward direction from the updated set of reached keepers, D', and in a forward direction from the common set of elements, S', are identified as being in a set of components affected by the timing exception. For this iteration, the set is {x, y}.

At 805, the set of components identified at 804 is added to set {b, c} identified in the second iteration.

At 806, control determines that no additional set from the superset of source components exist and terminates the procedure at 807.

Referring back to FIG. 7, a superset of source components that represent source keepers of potential clouds is identified. For the second exception, at 701, a depth first search is performed in a backward direction starting from each of the exception destination keepers {d}. For $DFS_1=d$, the depth first search visits and stops at the component a.

At 705, the first component visited from the depth first search is added to a set of predecessors, P. P={c}.

At 709, the superset of source components, S, is updated by taking the union of S with $P_k$. S={{C}}.

At 710, a set Q is created which takes a union of elements in subsets in set S which have an element in set P. The set S is then updated by removing any subset which includes a member of set P. The set S is then further updated by taking the union of S with the set Q. S={{c}}.

At 711, j is incremented by one and returns to 703.

At 703, since j is not less than the number of visited components, control terminates the method at 704.

Referring back to FIG. 8, a set of components affected by the second timing exception is identified. At 801, components common to a set from the superset of source components, S, and exception source keepers is identified. The set from the superset of source components is {c}. The exception source keepers is {c}. The common set of elements designated S' is {c}.

At 802, a depth first search in a forward direction starting from each component identified at procedure 801 is performed. The DFS is stopped on any path when a keeper is encountered. The set of reached keepers designated as D' is {d}.

At 803, the set of reached keepers, D', is updated by including only components common with exception destination keepers. The updated set is {d}.

At 804, all components reachable in a backward direction from the updated set of reached keepers, D', and in a forward direction from the common set of elements, S', are identified as being in a set of components affected by the timing exception. For this iteration, the set is {c, d}.

At 806, control determines that no additional set from the superset of source components exist and terminates the procedure at 807.

According to an embodiment of the present invention, the sets of affected components from the first exception {b, c} and {x, y} may be merged with the set of affected components from the second exception {c, d}. This results in sets {b, c, d} and {x, y}.

Figure 10:
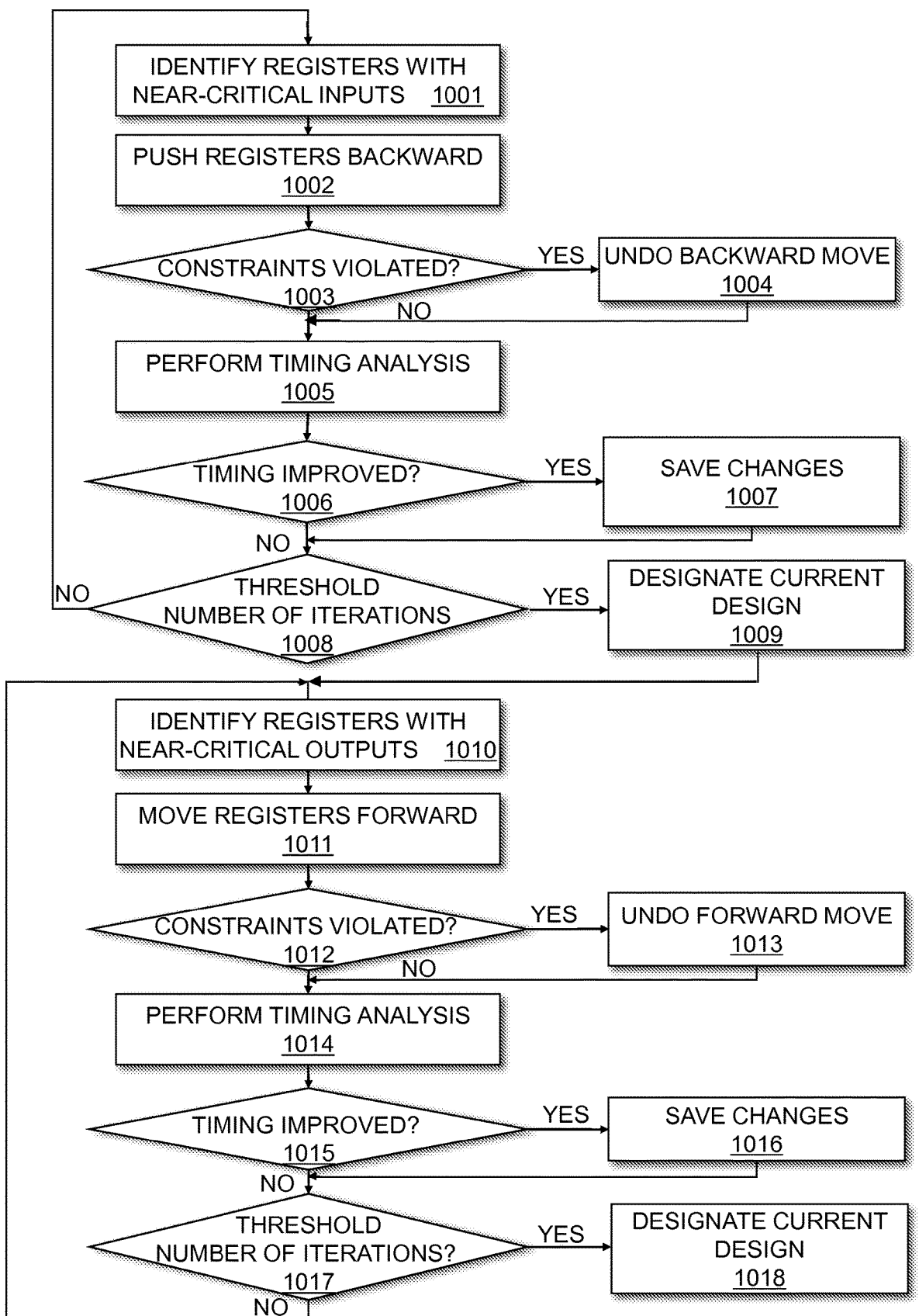
FIG. 10 illustrates a method for performing register retiming according to an exemplary embodiment of the present invention.

FIG. 10 is a flow chart illustrating a method for performing register retiming according to an exemplary embodiment of the present invention. The method shown in FIG. 10 may be used to implement procedure 109 shown in FIG. 1. At 1001, registers with inputs connected to near-critical paths are identified. According to an embodiment of the present invention, a near-critical path is a path in the system with a slack value below a threshold value.

At 1002, the identified registers at 1002 are pushed backwards. According to an embodiment of the present invention, a push backward involves moving the register backwards on the near-critical path to an input of a component. For the backward push to occur, a register needs to be present on each fanout of the component.

At 1003, it is determined whether pushing any of the registers backwards at 1002 causes a violation of a constraint. According to an embodiment of the present invention, constraints may include user-defined timing constraints. Constraints may include area constraints for the system such as global constraints on the maximum area increase allowed and constraints that ensure that registers are created evenly across the system. Constraints may include architectural constraints that define rules for handling carry chains and various restrictions on secondary signals such as control signals. Constraints may include implicit legality constraints, such as constraints for moving registers feeding asynchronous lines, to ensure that the system functions correctly after retiming is performed. Constraints may include prohibitions to cross time boundaries. Constraints may include user defined constraints such as constraints that prohibit the placement of components on designated sections of the target device. Constraints may also include the constraints identified at procedure 108 in FIG. 1 that prevent register retiming from utilizing the registers in identified areas affected by a timing exception. It should be appreciated that other types of constraints may also be defined and included for the purpose of determination of violation at 1003. If it is determined that pushing any of the registers backwards causes a violation of a constraint, control proceeds to 1004. If it is determined that pushing any of the registers backwards does not cause a violation of a constraint, control proceeds to 1005.

At 1004, backward pushes that result in violations are undone. Control proceeds to 1005.

At 1005, timing analysis is performed. Timing analysis establishes the length for each path in the system as well as the slack for each path in the system.

At 1006, it is determined whether the timing of the system has improved. Determining whether timing of the system has improved may be achieved by comparing the slack values of near-critical paths in the recently retimed system design with a previous system design. If the timing of the system has improved, control proceeds to 1007. If the timing of the system has not improved, control proceeds to 1008.

At 1007, the current changes to the system are saved. The current changes to the system include the changes made at 1002.

At 1008, it is determined whether a threshold number of iterations of 1001-1007 has been performed. If a threshold number of iterations of 1001-1007 has not been performed, control returns to 1001. If a threshold number of iterations of 1001-1007 has been performed, control proceeds to 1009.

At 1009, the current changes saved at 1007 are designated as the current design for the system.

At 1010, registers with outputs coupled to near-critical paths are identified. According to an embodiment of the present invention, a near-critical path is a path in the system with a slack value below a threshold value.

At 1011, the identified registers at 1010 are pushed forward. According to an embodiment of the present invention, a push forward involves moving the register forward on the near-critical path to an output of a component. For the forward push to occur, a register needs to be present on each input of the component.

At 1012 it is determined whether pushing any of the registers forwards at 1011 causes a violation of a constraint. The constraints described with reference to 1003 may be used at 1012. If it is determined that pushing any of the registers forward causes a violation of a constraint, control proceeds to 1013. If it is determined that pushing any of the registers forward does not cause a violation of a constraint, control proceeds to 1014.

At 1013, forward pushes that result in violations are undone. Control proceeds to 1014.

At 1014, timing analysis is performed. Timing analysis establishes the length for each path in the system as well as the slack for each path in the system.

At 1015, it is determined whether the timing of the system has improved. Determining whether timing of the system has improved may be achieved by comparing the slack values of near-critical paths in the recently retimed system design with a previous system design. If the timing of the system has improved, control proceeds to 1016. If the timing of the system has not improved, control proceeds to 1017.

At 1016, the current changes to the system are saved. The current changes to the system include the changes made at 1011.

At 1017, it is determined whether a threshold number of iterations of 1010-1016 has been performed. If a threshold number of iterations of 1010-1016 has not been performed, control returns to 1010. If a threshold number of iterations of 1010-1016 has been performed, control proceeds to 1018.

At 1018, the current changes saved at 1016 are designated as the current design for the system.

FIG. 10 illustrates an embodiment of the present invention where a series of push backwards are performed on identified registers followed by a series of push forwards. It should be appreciated that additional pushes may be performed at a different order. These additional pushes may be made with changes in the definition of near-critical paths. For example, after 1016, the threshold value of criticality for determining a near-critical path may be changed and additional push backwards and push forwards may be performed as described with reference to 1001-1017. It should further be appreciated that the method of register retiming illustrated in FIG. 10 is an exemplary embodiment of the present invention and that other register retiming methodologies and techniques may be used in its place.

FIG. 11 illustrates a report generated that identifies the results of register retiming according to an exemplary embodiment of the present invention. As shown, the report identifies registers and a critical chain that have been retimed and have moved over an exception. As shown, rows 40 and 13 are highlighted to report that registers hopped over a timing analysis exception. Rows 47 and 23 are also highlighted to report that registers hopped over a timing analysis exception. Rows 31 and 32 are highlighted to report that a critical chain passes through a timing analysis exception.

Figure 12:
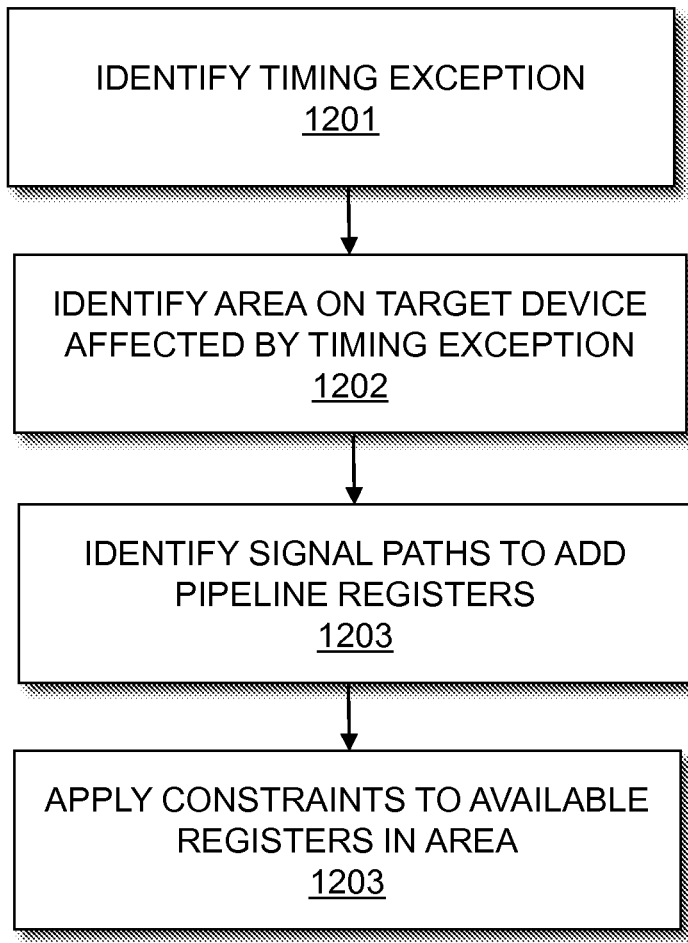
FIG. 12 is a flow chart illustrating a method for analyzing and processing timing exceptions according to another exemplary embodiment of the present invention.

FIG. 12 is a flow chart illustrating a method for analyzing and processing timing exceptions according to another exemplary embodiment of the present invention. The method illustrated in FIG. 12 may be used to implement procedure 108 shown in FIG. 1 and may be used alternatively or in conjunction with the method illustrated in FIG. 2. At 1201, timing exceptions are identified for portions of signal paths in the system. A signal path may traverse a plurality of components (nodes). A portion of the signal path may include a subset of the components and routing path in the signal path. Timing exceptions may be entered during design entry, after timing analysis, or during other portions of the design flow illustrated in FIG. 1. The timing exceptions may include, for example, a false path exception. A false path exception excludes a default timing constraint from being applied to a portion of the signal path.

At 1202, areas on the target device affected by the timing exceptions are identified. According to an embodiment of the present invention, a first component at a beginning of a timing exception is identified. A second component at an end of the timing exception is identified. An area affected by a timing exception may be defined to include the first component, the second component, and all components along a portion of a path between the first and second components.

At 1203, signal paths which to add pipelined registers are identified. According to an embodiment of the present invention, the identification may be achieved by presenting a user with the identity of signal paths subject to false path exceptions and prompting the user to select signal paths which to add pipelined registers. According to an embodiment of the present invention, a user may specify that all or none of the signal paths impacted by a false path exception should have pipelined registers inserted. The user may also identify specific signal paths impacted by false path exceptions which should have pipelined registers inserted.

At 1204, constraints are applied to both allocated and unallocated registers in the area for the purpose of register retiming a signal along the path. The constraints enforce the preservation and legality of the exception when register retiming is performed. When register retiming is attempted for a particular signal path, the unallocated registers in the identified area would be made unavailable. This results in a selection of unallocated registers outside the identified area for register retiming. As a result, registers at the boundaries of the area will be selected as pipelined registers to be added to the signal path.

According to an embodiment of the present invention, the procedures illustrated in FIGS. 1-2, 6-8, 10, and 12 may be performed by an EDA tool executed on a first computer system. A data file may be generated and transmitted to a second computer system to allow the design of the system to be further processed. Alternatively, the data file may be transmitted to a second computer system which may be used to program the target device according to the system design. It should be appreciated that the design of the system may also be output in other forms such as on a display device or other medium. By programming the target with the data file, components on the target device are physically transformed to implement the system.

FIGS. 1-2, 6-8, 10, and 12 are flow charts that illustrate embodiments of the present invention. The procedures described in these figures may be performed by an EDA tool implemented by a computer system. Some of the techniques illustrated may be performed sequentially, in parallel or in an order other than that which is described and that the procedures described may be repeated. It is appreciated that not all of the techniques described are required to be performed, that additional techniques may be added, and that some of the illustrated techniques may be substituted with other techniques.

Figure 13A:
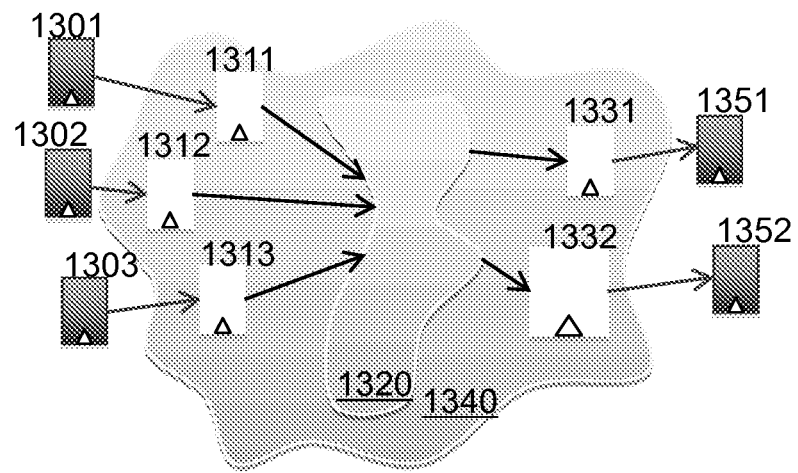
FIGS. 13A and 13B illustrate an example of performing register retiming with the insertion of pipelined registers in the presence of a false path timing exception according to a first embodiment of the present invention.
Figure 13B:
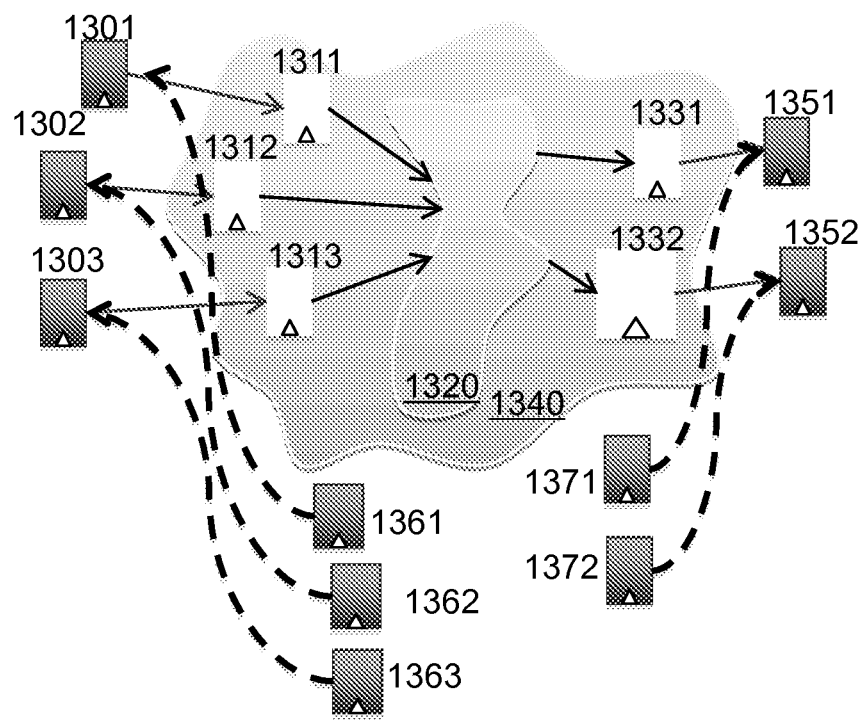

FIGS. 13A and 13B illustrate an example of performing register retiming with the insertion of pipelined registers in the presence of a false path timing exception according to a first embodiment of the present invention. FIG. 13A illustrates a network of components in a system on a target device. As shown, a first plurality of registers 1301-1303 transmit signals through the network along signal paths. When a timing exception exists for a portion of a signal path, one or more of the components in the network may be affected. In this example, a timing exception affects registers 1311-1313 (exception source keepers), combinational logic 1320, and registers 1331-1332 (exception destination keepers). According to an embodiment of the present invention, a keeper may be a register or an input/output pin on the target device. An exception source keeper and an exception destination keeper are registers at the beginning and end of a portion of a data path affected by a timing exception.

When the timing exception that impacts the portion of the signal is a false path timing exception, pipelined registers may be added to the signal path without adversely impacting timing on the signal path. As such, by adding the pipelined registers on the signal path, combinational logic may be split into multiple cycles which leads to an increase of slack in timing-critical paths. This allows for an increase in clock rates, and/or an increase in throughput.

Together, registers 1311-1313, combinational logic 1320, and registers 1331-1332, define an area or cloud 1340 on the target device where register retiming may not be performed. This prevents registers 1311-1313 and 1331-1332 from being retimed and effectually moved outside the area. It should be appreciated that the target device may include one or more unused or unallocated registers (not shown) in area 1340. Any unused or unallocated registers within the area 1340 on the target device may not be used for register retiming by being added to the signal paths traversing the area 1340. Allowing registers in area 1340 that have different timing requirements to move or by adding registers to signal paths traversing area 1340 may lead a register retiming procedure to converge on a lower maximum frequency requirement for the system.

Referring to FIG. 13B, registers 1361-1363 are inserted along the signal paths at the boundaries of the area 1340 defined by registers 1311-1313 (exception source keepers). Registers 1371-1372 are inserted along the signal paths at the boundaries of the area 1340 defined by registers 1331-1332 (exception destination keepers). The registers 1361-1363 and 1371-1372 generate pipeline stages at the false path timing exception boundaries. This allows the area 1340 with components affected by the false path timing exception between registers 1311-1313 and 1331-1332 to be preserved.

Figure 14A:
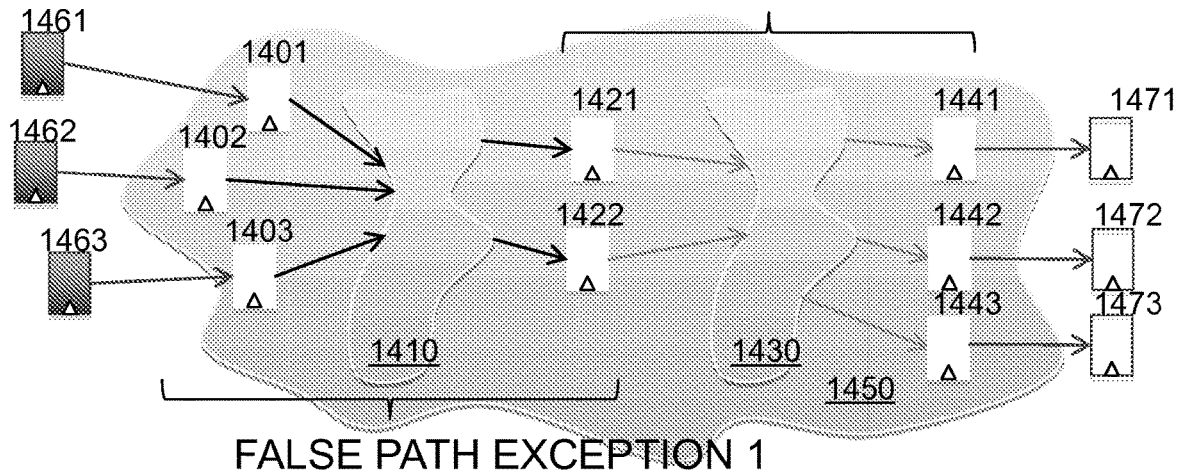
FIGS. 14A and 14B illustrate an example of performing register retiming with the insertion of pipelined registers in the presence of a plurality of false path timing exception according to an embodiment of the present invention.
Figure 14B:
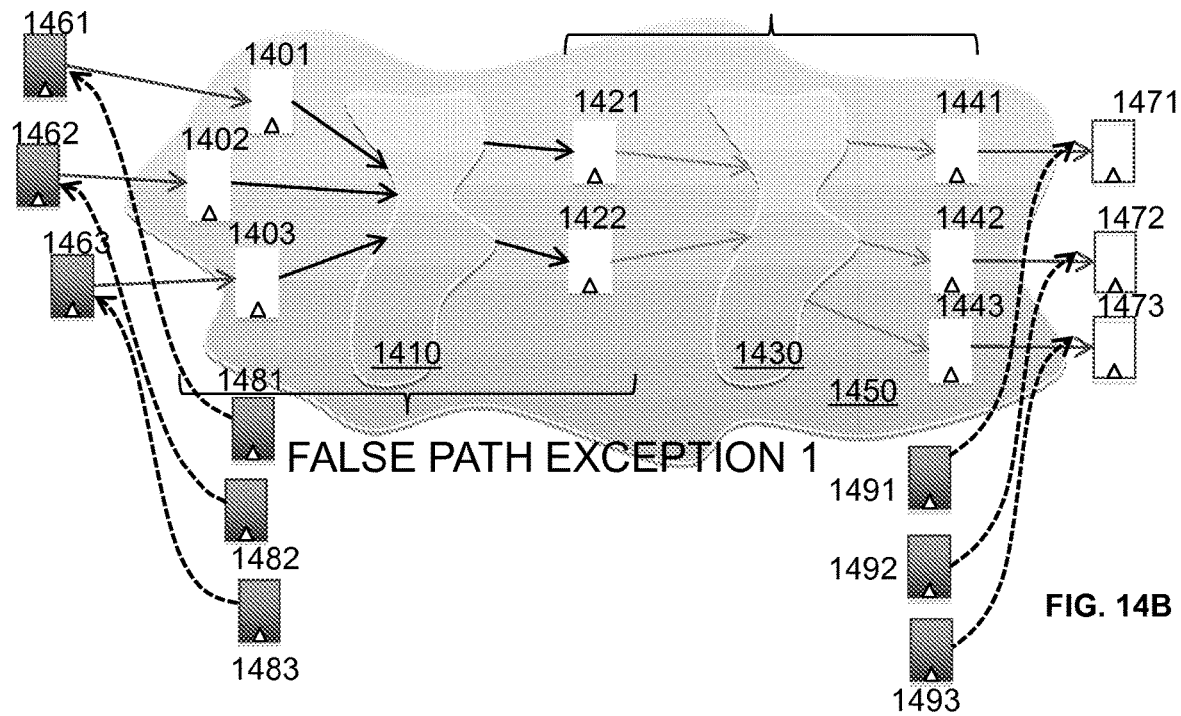

FIGS. 14A and 14B illustrate an example of performing register retiming with the insertion of pipelined registers in the presence of a plurality of false path timing exception according to an embodiment of the present invention. FIG. 14A illustrates an example where a first false path timing exception affects a first plurality of registers 1401-1403 (exception source keepers), combinational logic 1410, and a second plurality of registers 1421-1422 (exception destination keepers) to define a first area. A second false path timing exception affects the second plurality of registers 1421-1422 (exception source keepers), combinational logic 1430, and a third plurality of registers 1441-1443 (exception destination keepers) to define a second area. Since the timing exceptions generate overlapping areas, register retiming should not be performed across or within either areas. Both areas are merged together to form merged area 1450.

Referring to FIG. 14B, registers 1481-1483 are inserted along the signal paths at the boundaries of the area 1450 defined by registers 1401-1403 (exception source keepers). Registers 1491-1493 are inserted along the signal paths at the boundaries of the area 1450 defined by registers 1441-1442 (exception destination keepers). The registers 1481-1483 and 1491-1493 generate pipeline stages at the false path timing exception boundaries. This allows the area 1450 with components affected by the false path timing exception between registers 1401-1403 and 1441-1443 to be preserved.

According to an embodiment of the present invention, the properties of false paths timing exceptions are utilized during register retiming. Pipelined registers are added at source and/or destination keepers of a false path to improve circuit performance. Nodes in the circuit impacted by the false path are represented with constraints which enforce the preservation and legality of the false path in the presence of added pipeline registers. This allows for any number of pipeline registers to be added in order to achieve a desired solution while preserving the false path timing exception.

Source and destination keepers may be identified from false path timing exception specification. A netlist traversal may be performed to identify false path clouds which include a set of nodes in the netlist affected by each false path. False path timing exception clouds that share nodes may be merged to generate a set of non-overlapping exception clouds. For each false path timing exception, constraints are added to preserve timing between source and destination keepers.

Figure 15:
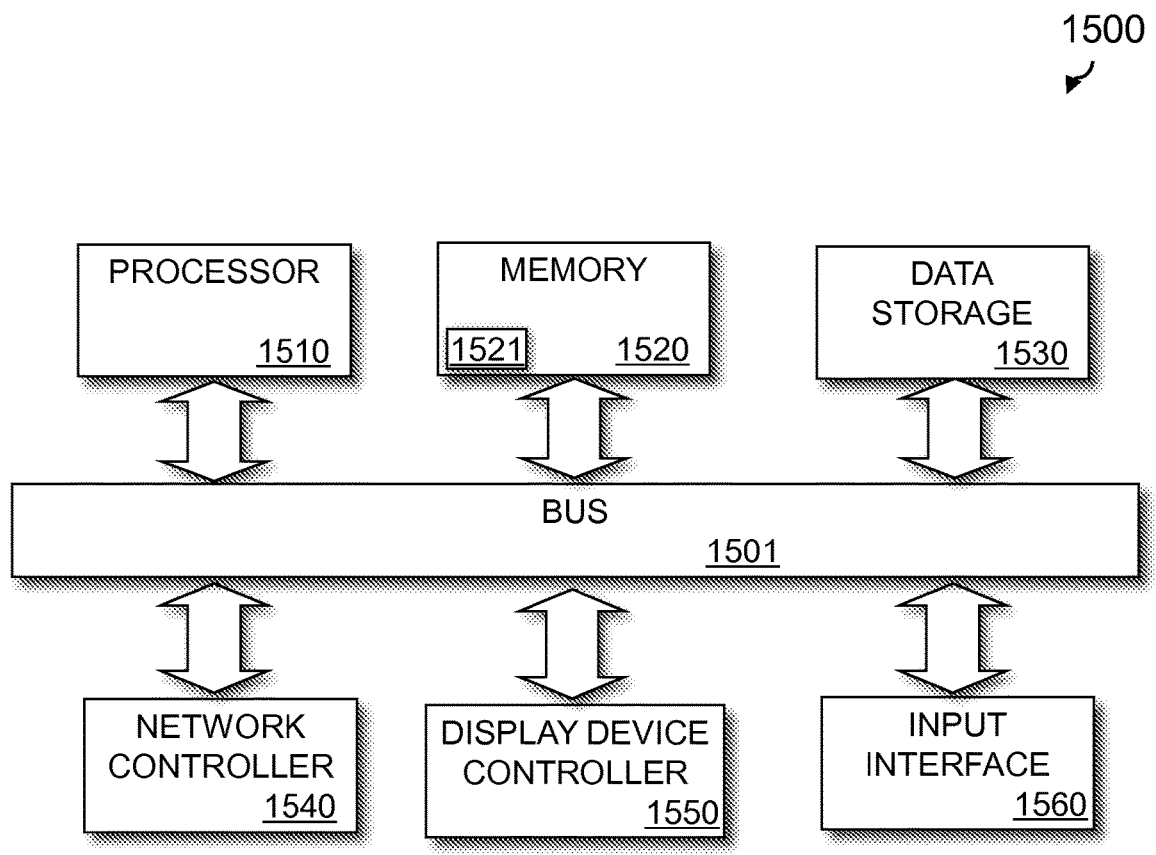
FIG. 15 illustrates a block diagram of a computer system implementing a system designer according to an embodiment of the present invention.

FIG. 15 is a block diagram of an exemplary computer system 1500 in which an example embodiment of the present invention resides. The computer system 1500 includes a processor 1510 that process data signals. The processor 1510 is coupled to a bus 1501 or other switch fabric that transmits data signals between processor 1510 and other components in the computer system 1500. The computer system 1500 includes a memory 1520. The memory 1520 may store instructions and code represented by data signals that may be executed by the processor 1510. A data storage device 1530 is also coupled to the bus 1501

A network controller 1540 is coupled to the bus 1501. The network controller 1540 may link the computer system 1500 to a network of computers (not shown) and supports communication among the machines. A display device controller 1550 is coupled to the bus 1501. The display device controller 1550 allows coupling of a display device (not shown) to the computer system 1500 and acts as an interface between the display device and the computer system 1500. An input interface 1560 is coupled to the bus 1501. The input interface 1560 allows coupling of an input device (not shown) to the computer system 1500 and transmits data signals from the input device to the computer system 1500.

A system designer 1521 may reside in the memory 1520 and be executed by the processor 1510. According to an embodiment of the present invention, the system designer 1121 analyzes and processes timing exceptions. According to an embodiment of the present invention, areas on a target device that include components affected by timing exceptions for portions of signal paths are identified. The areas may also be referred to as "clouds". Unallocated registers on the target device residing in the identified areas are identified as registers that may not be utilized for register retiming. Constraints may be utilized to prevent register retiming from utilizing the registers in the identified areas. The system designer 1521 may also perform register retiming by moving identified registers across combinational or routing circuit elements to reduce the length of timing-critical or near critical paths as determined by timing analysis. According to another embodiment of the present invention, the system designer 1521 may also perform register retiming by adding pipeline registers at boundaries of the area. Register retiming is performed respecting the constraints established.

Figure 16:
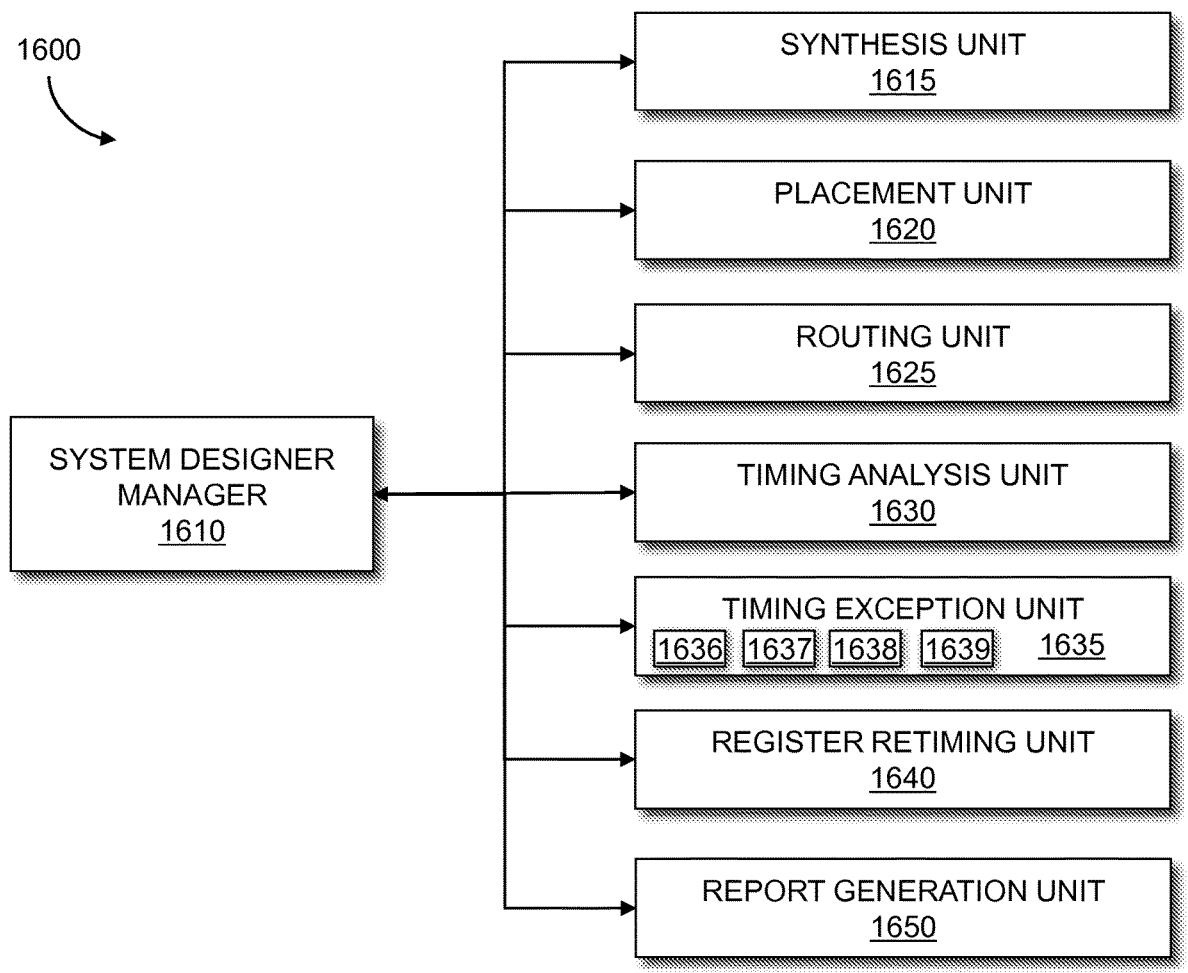
FIG. 16 is a block diagram of a system designer according to an embodiment of the present invention.

FIG. 16 illustrates a system designer 1600 according to an embodiment of the present invention. The system designer 1600 may be an EDA tool for designing a system on a target device such as an FPGA, ASIC, structured ASIC, or other circuitry. FIG. 16 illustrates modules implementing an embodiment of the system designer 1600. According to one embodiment, the modules represent software modules and system design may be performed by a computer system such as the one illustrated in FIG. 15 executing sequences of instructions represented by the modules shown in FIG. 16. Execution of the sequences of instructions causes the computer system to support system design as will be described hereafter. In alternate embodiments, hard-wire circuitry may be used in place of or in combination with software instructions to implement embodiments of present invention. Thus, embodiments of present invention are not limited to any specific combination of hardware circuitry and software.

The system designer 1600 includes a designer manager 1610. The system designer manager 1610 is connected to and transmits data between the other components of the system designer 1600. The system designer manager 1610 provides an interface that allows a user to input data into the system designer 1600 and that allows the system designer 1100 to output data to the user. According to an embodiment of the present invention, a design for the system along with timing exceptions may be input using the system designer manager 1610. The timing exceptions may be applied to a portion of a signal path where the timing exception for the portion of the signal path is different from a default timing constraint applied to other portions of the signal path. According to an embodiment of the present invention, the system designer manager 1610 may present one or more signal paths subject to a timing exception, such as a false path, to a user and receive one or more assignments from the user that indicates which of the signal paths to insert pipeline registers.

The system designer 1600 includes a synthesis unit 1615. The synthesis unit 1615 generates a logic design of the system to be implemented by the target device. According to an embodiment of the present invention, the synthesis unit 1615 generates an optimized logical representation of the system from the HDL design definition and maps the optimized logic design. According to an embodiment of the present invention, a netlist is generated from mapping. This netlist may be an optimized technology-mapped netlist generated from the HDL.

The system designer 1100 includes a placement unit 1620. According to an embodiment of the present invention, the placement unit 1620 places the mapped logical system design on the target device. Placement works on the technology-mapped netlist to produce a placement for each of the functional blocks. According to an embodiment of the present invention, placement unit 1620 fits the system on the target device by determining which resources on the logic design are to be used for specific logic elements, and other function blocks determined to implement the system as determined during synthesis. Placement may include clustering which involves grouping logic elements together to form the logic clusters present on the target device.

The system designer 1600 includes a routing unit 1625 which routes the placed design on the target device. The routing unit 1625 allocates routing resources on the target device to provide interconnections between logic gates, logic elements, and other components on the target device.

The routing unit 1625 may also perform routability optimization on the placed logic design.

The system designer 1600 includes a timing analysis unit 1630 which performs timing analysis on the design of the system generated. According to an embodiment of the present invention, the timing analysis determines whether timing constraints of the system are satisfied. The timing analysis may utilize approximations depending on when it is performed.

The system designer 1630 includes a timing exception unit 1635. According to an embodiment of the present invention, the timing exception unit 1635 includes a timing exception identification unit 1636. The timing exception identification unit 1636 identifies timing exceptions for portions of signal paths in the system. The timing exception identified may include false path, multi-cycle, minimum/maximum delay and other exceptions. The timing exception unit 1635 includes an area identification unit 1637. The area identification unit 1637 identifies areas (clouds) on the target device that include components affected by timing exceptions for portions of signal paths. According to an embodiment of the present invention, the area identification unit 1637 may perform the procedures described with reference to FIGS. 6-8. The timing exception unit 1635 includes a pipeline register unit 1638. The pipeline register unit 1638 identifies signal paths affected by a false path timing exception to insert pipeline registers. According to an embodiment of the present invention, the pipeline register unit 1638 identifies signal paths to insert pipeline registers in response to information received from the system designer manager 1610 obtained from the user. The timing exception unit 1635 includes a constraints unit 1639. The constraints unit 1639 applies constraints to unallocated registers in the areas identified to prevent the unallocated registers from being used for register retiming.

The system designer 1600 includes a register retiming unit 1640. According to an embodiment of the present invention, the register retiming unit 1640 moves identified registers across combinational circuit elements to reduce the length of timing-critical or near critical paths as determined by the timing analysis unit 1630. The register retiming unit 1640 may perform the procedures illustrated in FIG. 10 while honoring the constraints applied by the constraints unit 1639. According to another embodiment of the present invention, the register retiming unit 1640 may also insert registers at or outside of boundaries of areas affected by a false path timing exception.

The system designer 1600 includes a report generation unit 1650. The report generation unit 1650 generates a report that identifies the results of register retiming to a user. According to an embodiment of the present invention, the report may identify registers that have moved over an exception and a critical chain that has been retimed. The report may also identify a number and location of the pipeline registers added. Information from the report may be used by the user to modify settings for register retiming for a future iteration of register retiming.

It should be appreciated that embodiments of the present invention may be provided as a computer program product, or software, that may include a computer-readable or machine-readable medium having instructions. The instructions on the computer-readable or machine-readable medium may be used to program a computer system or other electronic device. The machine-readable medium may include, but is not limited to, floppy diskettes, optical disks, CD-ROMs, and magneto-optical disks or other type of media/machine-readable medium suitable for storing electronic instructions. The techniques described herein are not limited to any particular software configuration. They may find applicability in any computing or processing environment. The terms "computer-readable medium" or "machine-readable medium" used herein shall include any medium that is capable of storing or encoding a sequence of instructions for execution by the computer and that cause the computer to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

Figure 17:
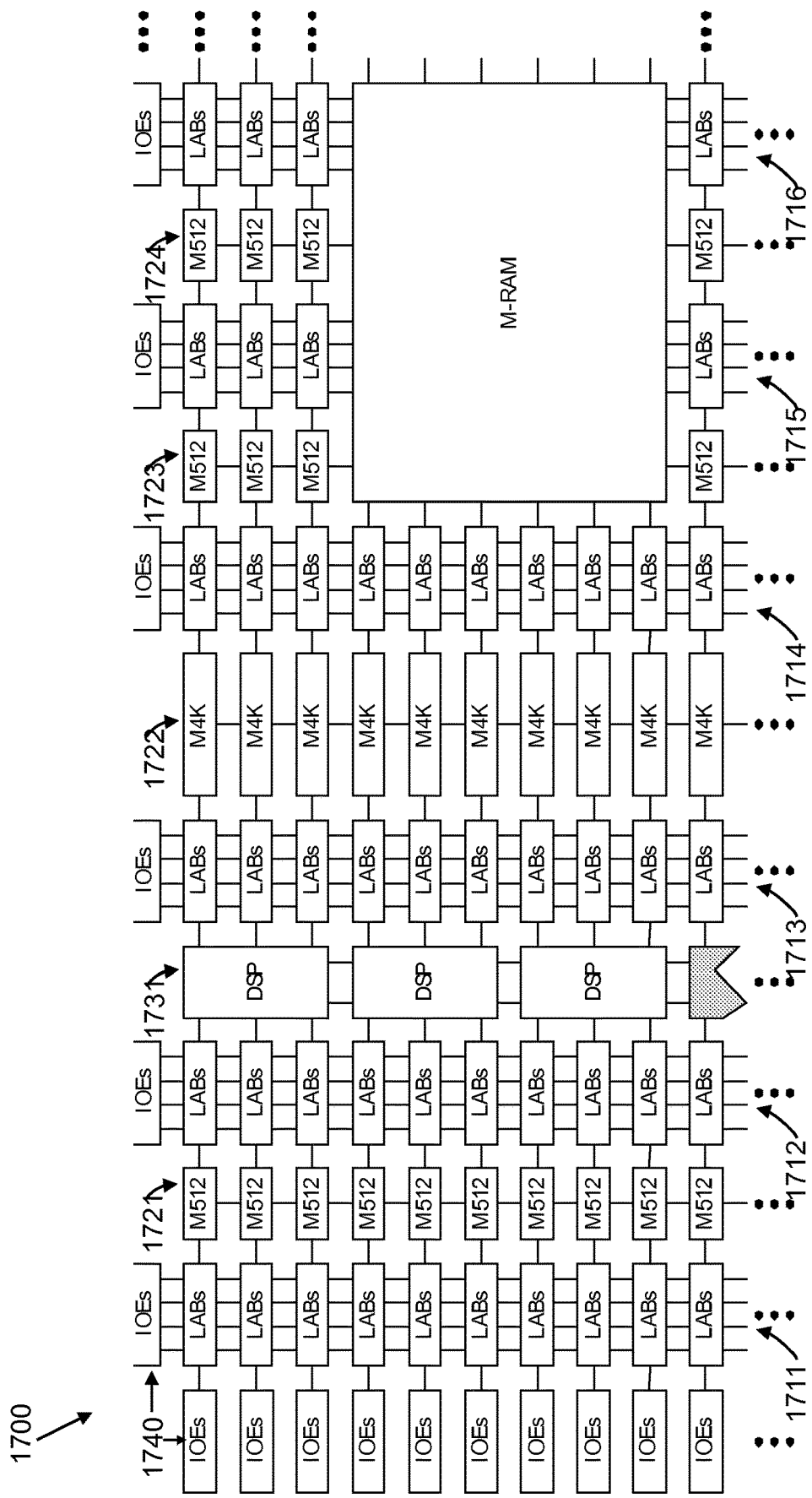
FIG. 17 illustrates an exemplary target device according to an embodiment of the present invention.

FIG. 17 illustrates a device 1700 that may be used to implement a target device according to an embodiment of the present invention. The device 1700 is a field programmable gate array (FPGA) that includes a plurality of logic-array blocks (LABs). Each LAB may be formed from a plurality of logic blocks, carry chains, LAB control signals, look up table (LUT) chain, and register chain connection lines. A logic block is a small unit of logic providing efficient implementation of user logic functions. A logic block includes one or more combinational cells, where each combinational cell has a single output, and registers. According to one embodiment of the present invention, the logic block may operate similarly to a logic element (LE), such as those found in the Stratix or Cyclone devices manufactured by Altera® Corporation, or a combinational logic block (CLB) such as those found in Virtex devices manufactured by Xilinx Inc. In this embodiment, the logic block may include a four input LUT with a configurable register. According to an alternate embodiment of the present invention, the logic block may operate similarly to an adaptive logic module (ALM), such as those found in Stratix devices manufactured by Altera Corporation. LABs are grouped into rows and columns across the device 1700. Columns of LABs are shown as 1711-1716. It should be appreciated that the logic block may include additional or alternate components.

The device 1700 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the device in between selected LABs or located individually or in pairs within the device 1700. Columns of memory blocks are shown as 1721-1724.

The device 1700 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the device 1700 and are shown as 1731.

The device 1700 includes a plurality of input/output elements (IOEs) 1740. Each IOE feeds an IO pin (not shown) on the device 1700. The IOEs 1740 are located at the end of LAB rows and columns around the periphery of the device 1700. Each IOE may include a bidirectional IO buffer and a plurality of registers for registering input, output, and output-enable signals.

The device 1700 may include routing resources such as LAB local interconnect lines, row interconnect lines ("H-type wires"), and column interconnect lines ("V-type wires") (not shown) to route signals between components on the target device.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A non-transitory computer readable medium including a sequence of instructions stored thereon for causing a computer to execute a method for designing a system on a target device, comprising:
identifying a timing exception for a portion of a signal path;
identifying an area on the target device that includes components affected by the timing exception; and
generating constraints that prevent registers residing in the area from being added along the portion of the signal path for pipelining, wherein at least one of the identifying and performing is performed by a processor.

2. The non-transitory computer readable medium of claim 1, wherein the timing exception for the portion of the signal path comprises a timing condition permitted for the portion of the signal path that is different from a default timing constraint applied to other portions of the signal path.

3. The non-transitory computer readable medium of claim 1, wherein the timing exception for the portion of the signal path comprises a timing condition permitted for the portion of the signal path that is different from a default timing constraint applied to other signal paths.

4. The non-transitory computer readable medium of claim 1, wherein the timing exception comprises a false path that excuses a default timing constraint from being applied to the portion of the signal path.

5. The non-transitory computer readable medium of claim 1, wherein the method further comprises performing register retiming where pipeline registers are added along the signal path at boundaries of the area.

6. The non-transitory computer readable medium of claim 5, wherein the pipeline registers are added in response to an assignment set by a user.

7. The non-transitory computer readable medium of claim 5, wherein the pipeline registers are added in equal numbers at each boundary of the area.

8. The non-transitory computer readable medium of claim 1 further comprising generating a report to a user that identifies a number and location of the pipeline registers.

9. The non-transitory computer readable medium of claim 1, wherein identifying the area that includes components affected by the timing exception comprises:
identifying a first component at a beginning of the timing exception;
identifying a second component at an end of the timing exception; and
defining the area to include the first component, the second component, and all components along the portion of the path between the first and second components.

10. The non-transitory computer readable medium of claim 1 further comprising:
generating a data file that includes a design of the system; and
programming the target device with the data file to physically transform components on the target device to implement the system.

11. A method for designing a system on a target device, comprising:
- identifying a timing exception for a portion of a signal path;
- identifying an area on the target device that includes components affected by the timing exception; and
- generating constraints that prevent registers residing in the area from being added along the portion of the signal path for pipelining, wherein at least one of the identifying and performing is performed by a processor.

12. The method of claim 11, wherein the timing exception for the portion of the signal path comprises a timing condition permitted for the portion of the signal path that is different from a default timing constraint applied to other portions of the signal path.

13. The method of claim 11, wherein the timing exception for the portion of the signal path comprises a timing condition permitted for the portion of the signal path that is different from a default timing constraint applied to other signal paths.

14. The method of claim 11 further comprising performing register retiming where pipeline registers are added along the signal path at boundaries of the area.

15. The method of claim 11, wherein identifying the area that includes components affected by the timing exception comprises:
- identifying a first component at a beginning of the timing exception;
- identifying a second component at an end of the timing exception; and
- defining the area to include the first component, the second component, and all components along the portion of the path between the first and second components.

16. The method of claim 11 further comprising:
- generating a data file that includes a design of the system; and
- programming the target device with the data file to physically transform components on the target device to implement the system.

17. A system designer, comprising:
- a timing exception identification unit that identifies a timing exception in a system;
- an area identification unit that identifies an area on a target device that includes components affected by the timing exception;
- a pipeline register unit that identifies signal paths affected by the timing exception to insert pipeline registers; and
- a constraints unit that applies constraints to unallocated registers in the area on the target device identified to prevent the unallocated registers from being used for register retiming, wherein at least one of the timing exception identification unit, area identification unit, pipeline register unit, and constraints unit is implemented by a processor.

18. The system designer of claim 17 further comprising a system designer manager that presents the signal paths identified to be affected by the timing exception to a user and receives one or more assignments from the user that indicates which of the signal paths to pipeline.

19. The system designer of claim 17 further comprising a register retiming unit to perform register retiming on the system while complying with the constraints.

20. The system designer of claim 19, wherein the register retiming unit adds pipeline registers at boundaries outside the area.

21. The system designer of claim 17 further comprising a system designer manager that generates a data file that includes a design of the system, and that programs the target device with the data file to physically transform components on the target device to implement the system.

* * * * *